(12) United States Patent
Ghestem

(10) Patent No.: US 11,975,875 B2
(45) Date of Patent: May 7, 2024

(54) ROBOTIC METHOD FOR LOADING CASES

(71) Applicant: VELEC SYSTEMES, Bondues (FR)

(72) Inventor: Florian Ghestem, Bondues (FR)

(73) Assignee: Velec Systemes, Bondues (FR)

( * ) Notice: Subject to any disclaimer, the term of this patent is extended or adjusted under 35 U.S.C. 154(b) by 70 days.

(21) Appl. No.: 17/533,409

(22) Filed: Nov. 23, 2021

(65) Prior Publication Data

US 2022/0161951 A1 May 26, 2022

(30) Foreign Application Priority Data

Nov. 25, 2020 (FR) ...................................... 20 12116

(51) Int. Cl.
| | | |
|---|---|---|
| *B25J 9/16* | (2006.01) | |
| *B25J 9/00* | (2006.01) | |
| *B65B 35/38* | (2006.01) | |
| *B65B 43/10* | (2006.01) | |
| *B65B 43/46* | (2006.01) | |
| *B65B 61/06* | (2006.01) | |
| *B65B 69/00* | (2006.01) | |
| *B65H 1/26* | (2006.01) | |
| *B65H 1/30* | (2006.01) | |

(52) U.S. Cl.
CPC ............. *B65B 43/10* (2013.01); *B25J 9/0096* (2013.01); *B25J 9/1687* (2013.01); *B25J 9/1697* (2013.01); *B65B 35/38* (2013.01); *B65B 43/46* (2013.01); *B65B 61/06* (2013.01)

(58) Field of Classification Search
CPC .... B25J 9/1687; B65B 43/46; B65B 69/0033; B65H 1/266; B65H 1/30; B65H 2301/42242; B65H 2301/422542; B65H 2701/1766

USPC ......................................................... 53/389.1
See application file for complete search history.

(56) References Cited

U.S. PATENT DOCUMENTS 5,011,467 A * 4/1991 Traegaardh ............. B65B 69/00
414/412
5,727,832 A 3/1998 Holter
(Continued)

FOREIGN PATENT DOCUMENTS

CH 703288 A2 * 12/2011 .......... B25J 15/0253
DE 20 2012 000940 U1 3/2012
(Continued)

OTHER PUBLICATIONS

The French Search Report, dated Aug. 24, 2021, in the corresponding French Appl. No. 2012116.

*Primary Examiner* — Thanh K Truong
*Assistant Examiner* — Patrick B Fry

(57) ABSTRACT

The invention relates to a robotic method for loading cases on a packaging line from cases contained in a closed parallelepiped container and wherein it is proceeded with the loading of the packaging line, after opening of the container (Ca) by:
/d/ insertion of a first jaw (30) of the clamp between the first face (F1) of the container and the first case (Et1) of the row of cases and, insertion of a second jaw (31) of the clamp between the last case (Etd) of the row of cases and the second face (F2) of the container, and approach of the jaws until seizing up the row of cases,
/e/ piloting of the robotic arm so as to extract the row of cases from the container grasped by the motor-driven clamp (3) and load the packaging line (Lg) with the row of cases.

12 Claims, 21 Drawing Sheets

(56) References Cited

U.S. PATENT DOCUMENTS

| | | | | |
|---|---|---|---|---|
| 5,984,623 | A * | 11/1999 | Smith | B65G 61/00 |
| | | | | 414/737 |
| 6,860,531 | B2 * | 3/2005 | Sherwin | B25J 15/0616 |
| | | | | 294/185 |
| 8,295,980 | B2 * | 10/2012 | Williamson | B25J 15/0052 |
| | | | | 700/259 |
| 8,371,797 | B2 * | 2/2013 | Bonhomme | B65G 57/00 |
| | | | | 74/612 |
| 9,783,372 | B2 * | 10/2017 | De Block | B65G 47/248 |
| 11,192,719 | B2 * | 12/2021 | Lert, Jr. | G06Q 50/28 |
| 11,491,656 | B2 * | 11/2022 | Edwards | G06Q 10/087 |
| 11,685,055 | B2 * | 6/2023 | Lee | B65B 69/00 |
| | | | | 294/87.1 |
| 2020/0039746 | A1 * | 2/2020 | Lert, Jr. | B65B 69/0025 |
| 2021/0331327 | A1 * | 10/2021 | Lee | B25J 15/0253 |

FOREIGN PATENT DOCUMENTS

| | | |
|---|---|---|
| EP | 0528772 A1 | 2/1993 |
| JP | 2002308238 A | 10/2002 |

* cited by examiner

ROBOTIC METHOD FOR LOADING CASES

CROSS-REFERENCE TO RELATED APPLICATIONS

This application claims priority from French Patent Application No. 20 12116 filed on Nov. 25, 2020. The French Patent Application is hereby expressly incorporated by reference herein in its entirety.

The present disclosure relates to a robotic method for loading cases on a packaging line from cases contained in a closed parallelepiped container, such as a cardboard box.

FIELD OF THE INVENTION

The present disclosure relates to the field of food, such as biscuits or others, packaging.

Food products are typically packaged in a (plastic) primary packaging, which, in turn, is packaged in a cardboard case.

This cardboard case is formed by a cardboard blank, grooved, and cut, then glued, to form the faces of the tubular case, including flaps for closure of at least one mouth of the case at one of the tubular ends of the case.

This case includes four fold lines, enabling the storage of the case laid flat by folding of the case in a laid-flat position around its four fold lines, and then unfolding thereof around the fold lines for forming the volume thereof.

In food-making lines, the cases are delivered on pallets, in cardboard boxes receiving a row of cases stored laid flat in the cardboard box, parallel to each other, vertically, namely bearing on their edge on the bottom of the cardboard box.

These cases are intended to feed the conveyor of a packaging line known to a person skilled in the art as "Cartoner".

At each stroke of the cartoner, the conveyor advances and enables two vacuum grippers of a first station of the cartoner to grasp two opposite faces of the case (then laid flat), then the two grippers are configured to spread apart in order to ensure forming of the volume of the case around its fold lines.

Once the case is open, a second station of the cartoner loads the case with the food product through its opening left open by the closure flaps.

A third station of the cartoner then folds up and glues the flaps to ensure closure of the case.

BACKGROUND OF THE INVENTION

In the food industry, for example in biscuit-making factories, the cartoners operate at high rates, typically in the range of 200 strokes per minute, and it is therefore necessary to feed the conveyor of the cartoner with 200 cases each minute.

Nowadays, this loading mobilises an operator dedicated to this operation. Every minute, the operator must retrieve on a pallet a cardboard box containing the cases stored laid flat, then lifts it from the pallet to set it on a setting table. The operator proceeds with opening of the cardboard box by its upper opening, by removing the adhesive and by releasing, one-by-one, the four closure flaps contiguous to the four lateral walls of the cardboard box. The operator lifts this cardboard box again, before turning it over in order to pour all cases on the conveyor of the cartoner.

At each loading (approximately every minute), the operator must lift and turn over a cardboard box receiving the cases which weighs about ten kilograms which quite often leads to musculoskeletal disorders.

For a long time, there has been a need for facilitating loading of the cartoners with cases packaged in cardboard boxes, in their laid-flat position parallel to each other, vertically, namely bearing on their edge on the bottom of the cardboard box.

SUMMARY OF THE INVENTION

The present disclosure addresses this need.

There is provided a robotic method for loading cases on a packaging line from cases contained in a closed parallelepiped container, and wherein each of said cases comprising four fold lines configured to enable the storage of the cases in their laid-flat position, and enable unfolding of the case around the four fold lines in a volume-formed position where the case defines a tubular volume with at least one mouth enabling filling of the case, the case having closure flaps configured to enable closure of said mouth and wherein the cases are received in the container in their laid-flat position, in parallel against each other in the form of a row of cases, extending between two opposite faces of the parallelepiped container, called first face and second face, the row of cases laid flat having a first case of the row, laid flat, disposed parallel to the first face of the container, opposite the first face, and a last case of the row laid flat, parallel to the second face, opposite the second face, the cases extending according to the direction of the fold lines between a third face and a fourth face of the container, opposite to one another, the fifth face and the sixth face defining the bottom and the lid of the container and wherein said method is implemented by an installation comprising a robotic arm handling a gripping system having a motor-driven clamp with two jaws consisting of a first jaw and a second jaw, as well as an actuation mechanism configured to spread apart and bring the two jaws close to each other, in which method it is proceeded with the loading of the packaging line (Lg), after opening of the container by:
/d/ insertion of the first jaw of the clamp between the first face of the container and the first case of the row of cases and, insertion of the second jaw of the clamp between the last case of the row of cases and the second face of the container, and approach of the first jaw and of the second jaw then inserted in the container until seizing up the row of cases,
/e/ piloting of the robotic arm so as to extract the row of cases from the container grasped by the motor-driven clamp and load the packaging line with the row of cases, after the release of the row of cases by spreading apart the two jaws of the motor-driven clamp.

The features described in the following paragraphs may, optionally, be implemented. They may be implemented independently of each other or in combination with each other:

According to an embodiment of the method, the first face and the second face of the container respectively having portions protruding in height extending above the row of cases, on the side of the opening of the open container, the method providing, prior to /d/, for:

the positioning of the distal ends respectively of the first jaw and of the second jaw facing the protruding portions of the first face and of the second face of the container, and, the control of the drive mechanism to spread the two jaws of the motor-driven clamp apart and thus spread the first face apart from the second face of the container, while generating, on the one hand, a first interspace between the first face and the first case of the row of cases, and, on the other hand, a second interspace between the last case and the second face of the row and so that at /d/ the insertion of the first jaw of the motor-driven clamp between the first face of the container and the first case of the row and, the insertion of the second jaw of the clamp between the last case of the row and the second face of the container are performed through the descent of the first jaw and of the second jaw respectively in the first interspace and the second interspace.

According to an embodiment of the method, the first face and the second face of the container having on the side of the opening of the open container, respectively a first notch and a second notch, opening onto the side of the opening, the method providing, prior to /d/, for:

the positioning of the distal ends respectively of the first jaw and of the second jaw facing one another outside the container, respectively opposite the first notch and the second notch the control of the mechanism to bring the two jaws of the clamp partially close to each other, throughout the notches so as to tighten the first case and the last case of the row, without seizing up the row of cases, while creating, on the one hand, a first interspace between the first face and the first case of the row, and, on the other hand, a second interspace between the last case and the second face of the container and so that at /d/ the insertion of the first jaw of the motor-driven clamp between the first face of the container and the first case of the row and, the insertion of the second jaw of the clamp between the last case of the row and the second face of the container are performed through the descent of the first jaw and of the second jaw respectively in the first interspace and the second interspace.

According to still another embodiment of the method, the cases of the row of cases, including the first case and the last case of the row, having a protruding portion, on the opening side, the cases extending in height beyond the upper edge of the first face and the upper edge of the second face of the container then open, the method providing, prior to /d/, for:

the positioning the distal ends respectively of the first jaw and of the second jaw opposite the protruding portions of the first case and of the last case of the row the control of the actuation mechanism to bring the two jaws of the clamp close to each other so as to bring the two jaws of the clamp close to each other so as to tighten the first case and the last case of the row of cases, without seizing up the row of cases, while creating, on the one hand, a first interspace between the first face and the first case of the row, and, on the other hand, a second interspace between the last case and the second face of the container and so that at /d/ the insertion of the first jaw of the clamp between the first face of the container and the first case of the row and, the insertion of the second jaw of the clamp between the last case of the row and the second face of the container are performed through the descent of the first jaw and of the second jaw respectively in the first interspace and the second interspace.

The case loading robotic method may provide, prior to /d/ and /e/, for the opening of the container when the container rests on a surface through the fifth face of the container by:

/c/ piloting the robotic arm so as to open or remove the sixth face of the container forming a lid.

According to one embodiment, the gripping system handled by the robotic arm comprises a cutting member, and wherein at /c/ the robotic arm handling the cutting member is piloted so that the cutting member performs a continuous peripheral cut along the first, second, third and fourth faces of the container, and so as to enable the removal of the sixth face forming a lid. According to an embodiment of the case loading robotic method, consecutively to /c/ the robotic arm is piloted so as to grasp the lid detached by the peripheral cut, then to evacuate said lid.

According to still another embodiment of the case loading robotic method, said installation comprises a positioning table, comprising a setting plane extending according to the directions X and Y, said positioning table comprising stops cooperating with at least two perpendicular faces of the container ensuring wedging of the container and wherein the insertions of the jaws of the clamp according to /d/, and/or opening of the container according to /c/ are performed after wedging of the container by the stops according to the directions X and Y.

According to an embodiment of the method, said automated installation comprises at least one area for storing the containers stacked on top of each other on a pallet, and wherein it is proceeded with loading of the positioning table by:

/b/ grasping of a container stacked on the pallet by the robotic arm then piloting of the robotic arm to proceed with setting of the container on the positioning table.

According to still another embodiment of the case loading robotic method, said containers comprising a visual marking indicative of the orientation of the container according to the horizontal plane XY, and wherein the gripping system is equipped with a camera, and wherein, prior to /b/, it is proceeded with the recognition of the container by:

/a/ piloting of the robotic arm handling the gripping system so as to target the visual marking of a container stocked at the top of the stack in the field of view of the camera, and wherein said installation having:

a recognition module configured to recognise the visual marking of the image targeted by the camera and to determine the angle of the marking of the container in the reference frame of the positioning table, and a computing module configured to generate, from the angle of the marking determined by the recognition module, guide instructions to ensure at /b/, grasping of the targeted container in the field of the camera and setting of the container on the positioning table according to a determined orientation of the visual marking in the reference frame of the positioning table.

According to still another embodiment of the case loading robotic method, it is proceeded with the turnover of the container by 180° between grasping of the container in /b/, on the one hand, for which grasping of a container stacked on the pallet is ensured by the robotic arm and then piloting of the robot to proceed with setting of the container on the setting table and, on the other hand, wedging of the container according to the directions X and Y on the stops of the positioning table.

For example, the turnover of the container by 180° is ensured for one part, in /b/ by the robotic arm during setting of the container, and for the other part by a tilter controlled by an actuator equipping the positioning table.

According to one embodiment, the gripping system comprises a vacuum gripper configured to ensure grasping of the container during /b/, and/or configured for grasping of the lid and the evacuation thereof, where appropriate.

According to one embodiment, the vacuum gripper is a dual-zone gripper, with two independent grasping areas and wherein the container receiving the row of cases, as well as a protective sheet disposed inside the container, interposed between the lid and the cases, and wherein grasping of the lid detached by the peripheral cut is ensured by one of the two areas of the vacuum gripper, and the protective sheet is grasped by the other one of the two areas of the vacuum gripper, before evacuating the lid and the protective sheet together by the robotic arm grasped by the two areas of the vacuum gripper.

According to one embodiment, said installation comprises two areas for storing the containers consisting of a first storage area and a second storage area each receiving containers stacked on a pallet, each of the storage areas, accessible by the robotic arm (1) for the implementation of /b/, and wherein the two storage areas are separated by a physical barrier or a virtual monitoring barrier, the two storage areas respectively having two independent entrances for an operator, and wherein said installation comprises means for detecting an intrusion of the operator, configured to detect, while distinguishing them, an intrusion in the first storage area and in the second storage area and wherein the module for piloting and controlling the robotic arm is configured to work in masked time in one of the two storage areas, possibly at a reduced speed, when an intrusion is detected in the other storage area.

The present disclosure also relates to the use of the robotic method for loading cases on a packaging line operating continuously, said packaging line comprising means ensuring:

forming of the volume of the cases by unfolding the case around the fold lines,
loading of the cases with food products through the mouths of the cases,
and closure of the cases by folding over and gluing the closure flaps.

BRIEF DESCRIPTION OF THE DRAWINGS

Other features, details and advantages will appear upon reading the detailed description hereinafter, and upon analysing the appended drawings, wherein:

FIG. 12).

DESCRIPTION OF THE EMBODIMENTS

The present disclosure relates to a robotic method for loading cases Et on a packaging line Lg from cases contained in a closed parallelepiped container.

Figure 34:
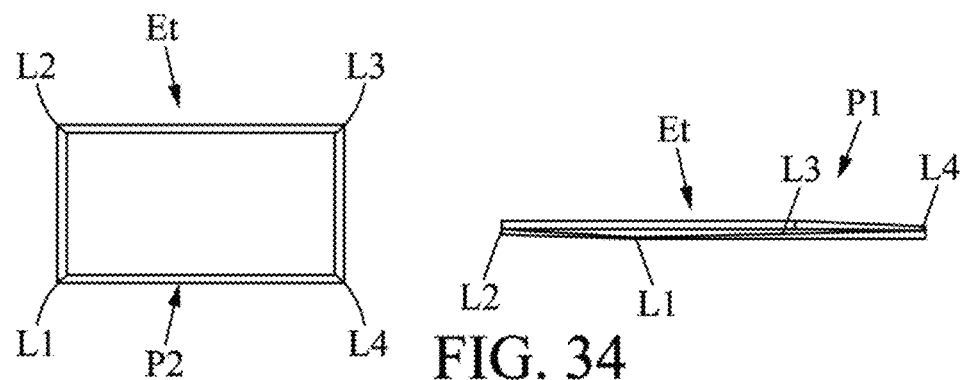
FIG. 34 is a view of the case according to the section A-A of FIG. 33 in its volume-formed position, and to the right in its laid-flat position, after folding around four fold lines of the case.

Each of said cases Et comprises fold lines L1, L2, L3, L4, typically four in number, configured to enable the storage of the cases in their laid-flat position P1, as illustrated to the right of FIG. 34, and enable unfolding of the case around the four fold lines L1, L2, L3, L4 in a volume-formed position P2 as illustrated to the left in FIG. 34.

Figure 33:
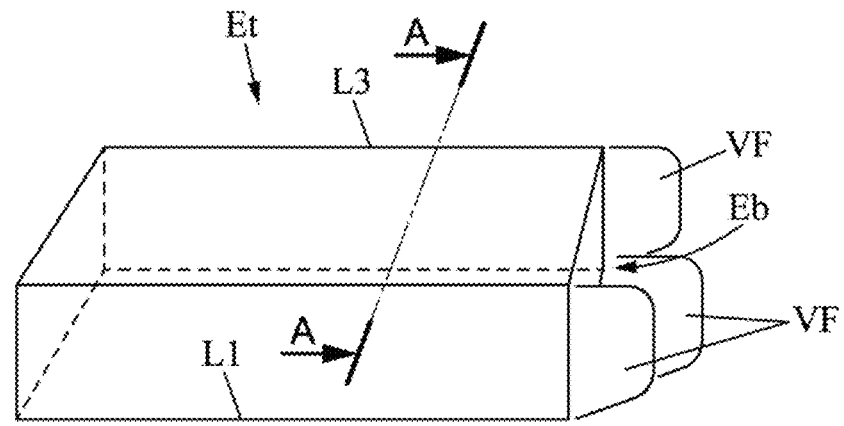
FIG. 33 is a view of a case in its volume-formed position, a mouth of the case being left open by closure flaps of the case.

In its volume-formed position P2, the case defines a tubular volume with at least one mouth Eb enabling filling of the case, and as shown for indication in FIG. 33. The case has closure flaps Vf configured to enable the closure of said mouth Eb.

Thus, the case loading method finds a particular application on a packaging line operating continuously, said packaging line Lg comprising means ensuring:

forming of the volume of the cases by unfolding the case around the fold lines L1, L2, L3, L4, loading of the cases with food products through the mouths Eb of the cases, and closure of the cases by folding over and gluing the closure flaps Vf.

Typically, the food products may consist of biscuits, cakes or others, typically received in a plastic primary packaging, the case then forming a secondary packaging.

The parallelepiped container Ca is typically made of corrugated cardboard.

Figure 35:
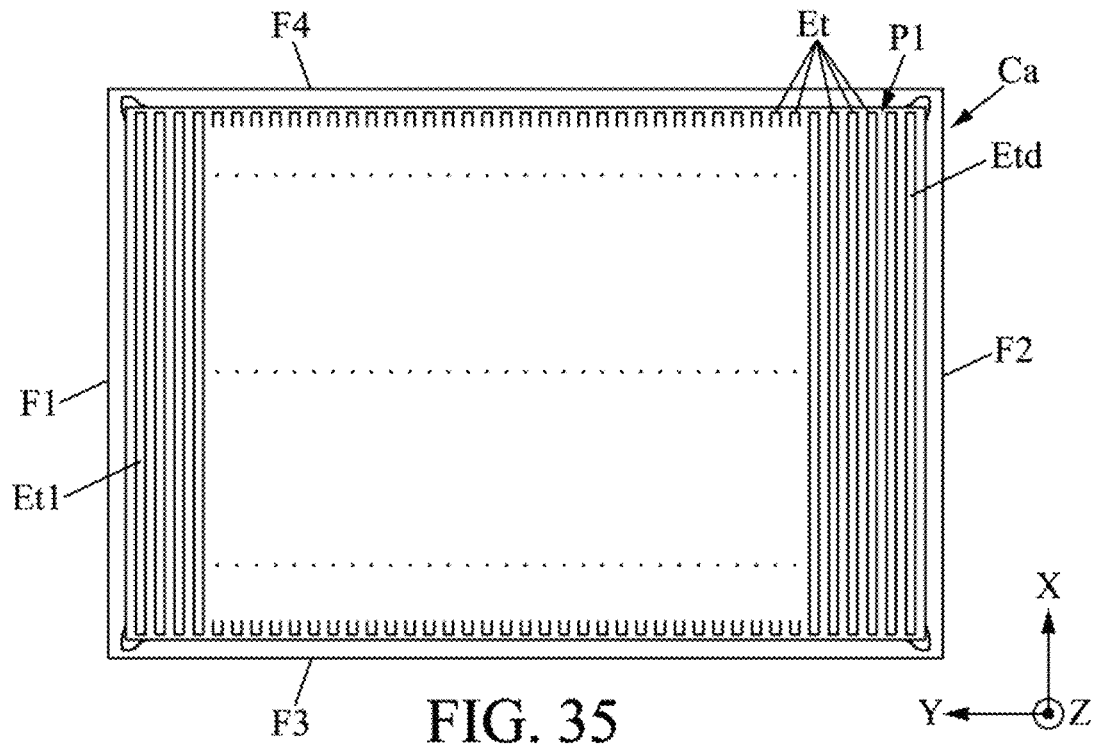
FIG. 35 is a view of the open container, a top view, illustrating the row of cases in their laid-flat position, the row extending from the first case of the row, facing the first face of the container, up to the last case, laid flat, facing the second face of the container.
Figure 36:
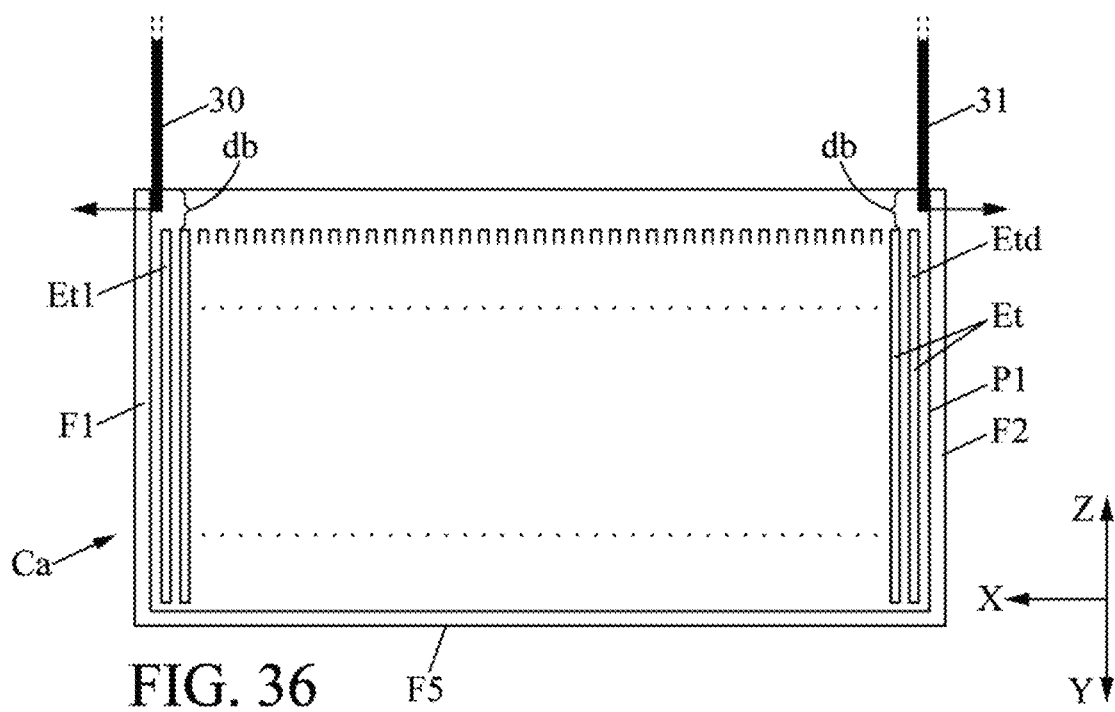
FIG. 36 is a view of the open container, of FIG. 35 according to a vertical sectional plane, illustrating the two jaws of the motor-driven clamp bearing respectively against the inside of the first face and of the second face, on protruding portions of the faces, in order to create interspaces when the jaws are spread apart, and according to a first embodiment of the method during the insertion of the jaw.

The cases Et are received and stored in the container Ca in their laid-flat position P1, in parallel against each other in the form of a row of cases, extending between two opposite faces of the parallelepiped container, called first face F1 and second face F2, the row of cases laid flat having a first case Et of the row, laid flat, disposed parallel to the first face F1 of the container, opposite the first face F1 in particular in contact, and a last case Etd of the row laid flat, parallel to the second face F2, opposite the second face in particular in contact, and as shown in FIGS. 35 and 36 in particular.

As shown in FIG. 35, the cases extending according to the direction of the fold lines L1 to L4 between a third face F3 and a fourth face F4 of the container, opposite to each other. The fifth face F5 and the sixth face F6, opposite to each other; define the bottom and the lid of the parallelepiped container.

The method according to the present disclosure is implemented by a robotic installation, illustrated according to one embodiment in the figures.

This installation comprises a robotic arm 1, for example a six-axis robotic arm, handling a gripping system 2.

This gripping system comprises a motor-driven clamp 3 with two jaws consisting of a first jaw 30 and a second jaw 31, as well as an actuation mechanism configured to spread apart and bring the two jaws 30 and 31 close to each other. Such a motor-driven clamp is illustrated in detail views in FIGS. 27 and 28.

Figure 27:
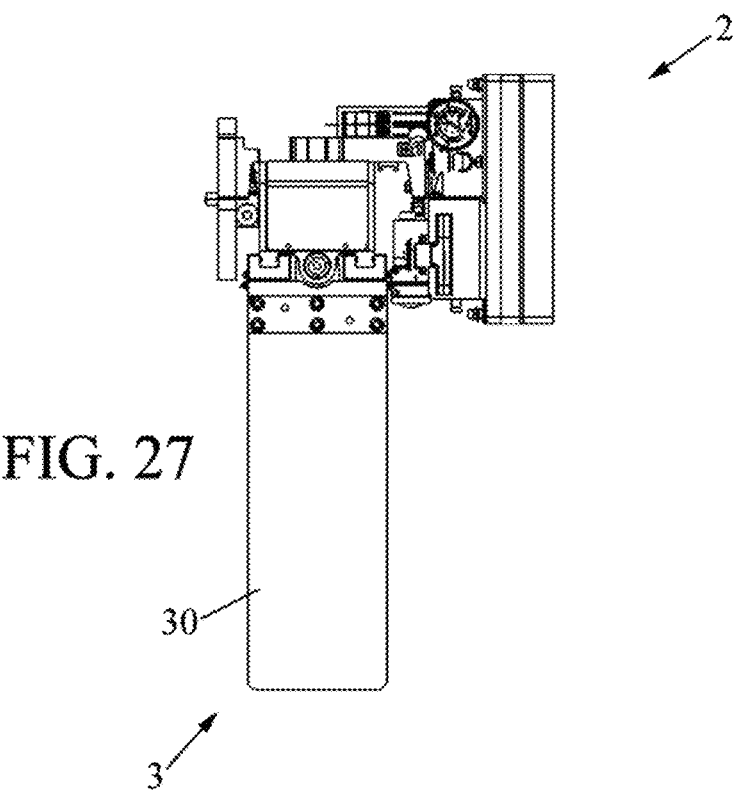
FIG. 27 is a view of the gripping system, according to FIG. 24, oriented so as to illustrate the motor-driven clamp.
Figure 28:
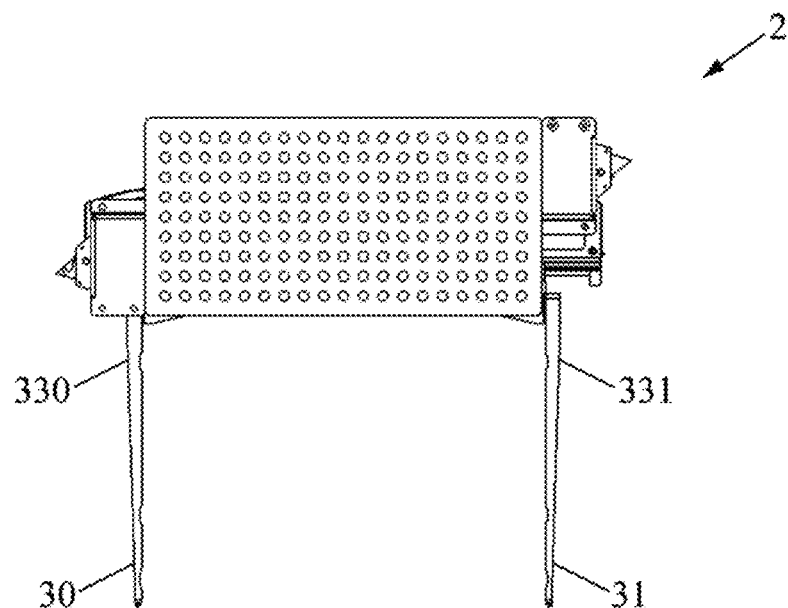
FIG. 28 is a view of the gripping system, according to FIG. 27, oriented so as to illustrate the motor-driven clamp whose two jaws, the first jaw and second jaw, point downwards.
Figure 29:
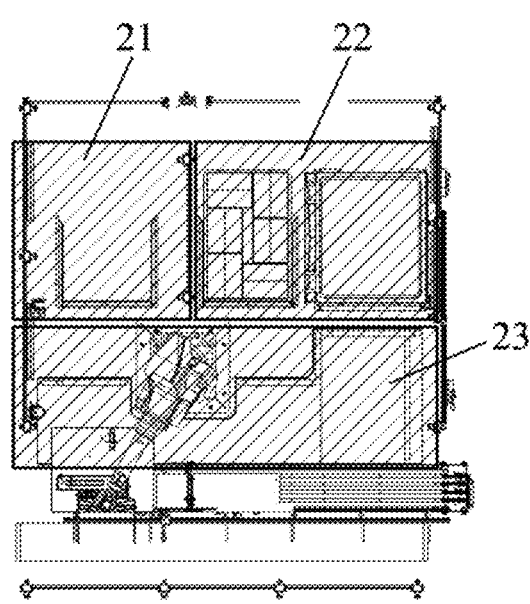
FIG. 29 is a top view of the installation, illustrating three secure areas subjected to independent monitoring; namely a monitoring area inside which the robotic arm is anchored, a first storage area of a first pallet receiving containers with cases, and a third storage area receiving a second pallet receiving containers with cases.

Thus and in FIGS. 27 and 28, the two jaws of the clamp, the first jaw 30 and second jaw 31, comprising planar elements which generally extend in two parallel planes according to the directions X and Z in the figures.

The first jaw 30 extends in particular according to the direction Z, from a proximal end secured to a first carriage of the actuation mechanism, up to a distal end of the first jaw 30, and the second jaw extends, from a proximal end secured to a second carriage, up to a distal end of the second jaw 31.

The first carriage embedding the first jaw 30 and the second carriage embedding the second jaw 31 can be moved according to the direction X, in FIG. 28, and driven by an actuator such as an electric cylinder. The approach of the jaws 30, 31 enables tightening and closure of the motor-driven clamp, and conversely, spreading of the jaws 30, 31 apart allows loosening and releasing an object.

The dimension of the jaws, the first jaw 30 and second jaw 31, according to the direction Y, is smaller than the dimension of the container separating the third face F3 and the fourth F4 and the jaws are thin according to the direction X, so as to facilitate the insertions of the jaws in the container, between respectively the first face F1 and the first case Et1, and between the last case Etd and the second face F2.

It should be noticed that the jaws could consist of metallic leaves, having a spring effect upon tightening. The two leaves may have a fold 330, 331, proximate to the proximal ends of the jaws.

According to the present disclosure, it is proceeded with the loading of the packaging line Lg, after opening of the container Ca by:

/d/ insertion of the first jaw 30 of the clamp between the first face F1 of the container and the first case Et1 of the row of cases and, insertion of the second jaw 31 of the clamp between the last case Etd of the row of cases and the second face F2 of the container, and approach of the first jaw 30 and of the second jaw 31 then inserted in the container until seizing up the row of cases, /e/ piloting of the robotic arm so as to extract the row of cases from the container grasped by the motor-driven clamp 3 and load the packaging line Lg with the row of cases, after the release of the row of cases by spreading apart the two jaws 30, 31 of the motor-driven clamp.

Thus, the method according to the present disclosure allows, in a robotic manner, grasping all of the cases of the row of cases Et received in the container Ca, extracting the cases from the open container by the gripping system 2, and moving the cases up to the packaging line Lg where the cases are released by spreading apart the two jaws 30, 31 of the gripping system.

Figure 19:
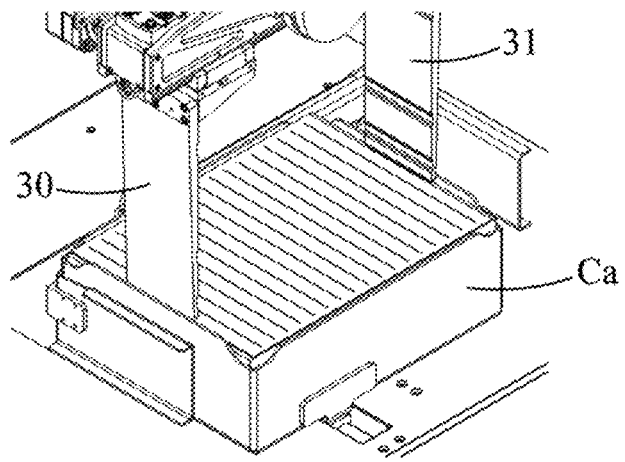
FIG. 19 is a view consecutive to FIG. 18, for which the robotic arm positions the distal ends of the first and second jaws of the motor-driven clamp of the gripping system, facing protruding portions of the first face and of the second face, with spreading of the two jaws so as to spread apart the faces and make the container yawn thereby creating a first interspace between the first face of the container and the first case of the row, and a second interspace between the second face of the container and the last case of the row.
Figure 20:
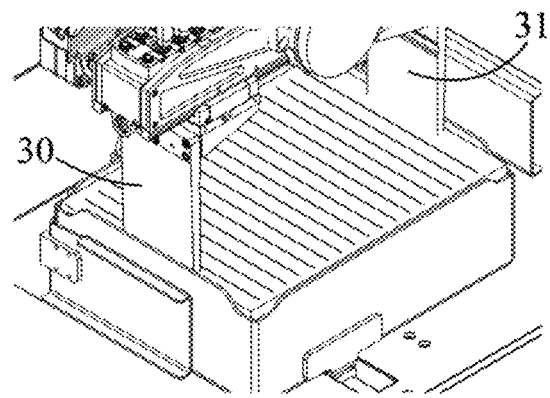
FIG. 20 is a view consecutive to FIG. 19, for which the robotic arm controls the jaws for descending in the two created interspaces, possibly by preferably proceeding with an approach of the jaws, during the descent of the jaws and until obtaining the seizing-up of the cases of the row.

FIGS. 19 and 20 illustrate as example, a possibility of insertion of the jaws in the container; FIG. 20 illustrating the position where the jaws, then immersed into the container ensure seizing up of the row of cases then brought close to each other. In this position, a special attention is paid, on the one hand, for the first jaw to bear on the first case and, on the other hand, for the second jaw to bear on the last case, outside the fold lines L1, L2, L3 and L4 of the laid-flat case. Thus, we avoid "breaking" a fold line of the case which would no longer be able to open on the packaging line and would be at the origin of a line jam.

To this end, each jaw may have wedges (not illustrated) settable in height according to the direction Z of the jaw bodies in FIG. 27 intended to come into contact with the cases, and so as to ensure that the clamp does not press on one of the fold lines (L1 to L4) of a case. These wedges are set in height so as to press on the case (first case or last case) on an area free of any fold line.

In general, the method could provide for actively and positively creating, on the one hand, a first interspace It1 between the first face F1 of the container Ca and the first case Et1 of the row of cases and, on the other hand, a second interspace It2 between the second face F2 of the container Ca and the last case Etd of the row of cases, prior to the insertion of the two jaws, the first jaw 30 and second jaw 31, in the interspaces It1, and It2.

Several possibilities could be considered for the creation of these interspaces It1, It2, ensuring, on the one hand, the insertion of the first jaw 20 between the first face F1 of the container and the first case Et1, and the insertion of the second jaw between the second face of the container F2.

Figure 37:
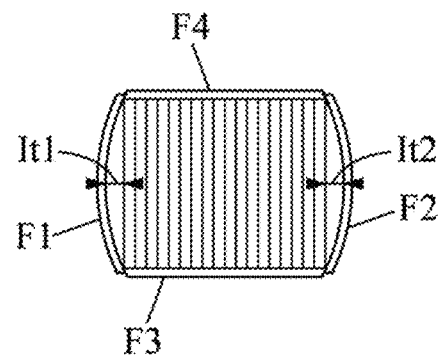
FIG. 37 is a top view, after spreading apart the jaws of FIG. 36, in order to make the container yawn thereby creating a first interspace between the first face of the container and the first case of the row, and a second interspace between the second face of the container and the last case of the row.
Figure 38:
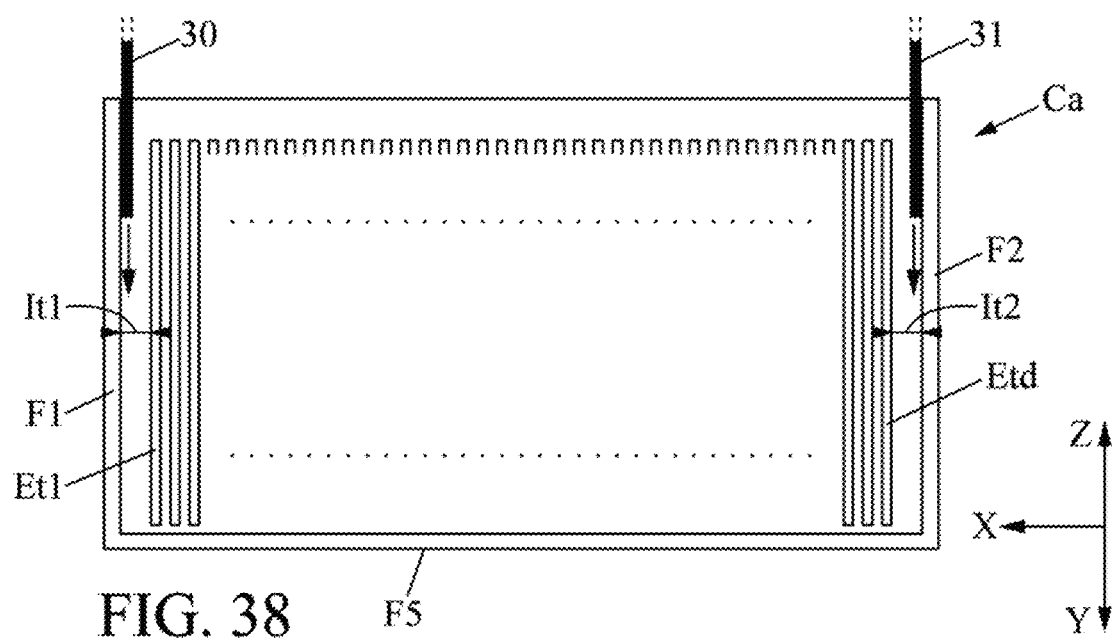
FIG. 38 is a view of the container according to the section of FIG. 36, illustrating the descent of the first jaw and of the second jaw, respectively in the first and second interspace, according to the first embodiment.

A first possibility for creating these two interspaces It1 and It2 consists in making the container Ca yawn and is illustrated in FIGS. 19 and 20, and in more details in FIGS. 36 to 38, and requires that the first face F1 and the second face F2 of the container CA respectively have portions db protruding in height extending above the row of cases, on the side of the opening of the open container.

Thus, and, in FIG. 36, it should be noticed that the first face F1, extends according to the direction Z, beyond the upper end of the laid-flat cases, and in particular of the first case Et1. Similarly, the second face F2 of the container, extends according to the direction Z, beyond the upper end of the laid-flat cases, and in particular of the last case Etd.

The method then provides, prior to /d/, for:
the positioning of the distal ends respectively of the first jaw 30 and of the second jaw 31 facing the protruding portions db of the first face F1 and of the second face F2 of the container, (cf. FIG. 19 or FIG. 36), and,
the control of the drive mechanism to spread the two jaws 30, 31 of the motor-driven clamp apart and thus spread the first face F1 apart from the second face F2 of the container, while generating, on the one hand, a first interspace It1 between the first face F1 and the first case Et1 of the row of cases, and, on the other hand, a second interspace It2 between the last case Et2 and the second face F2 of the row Etui.

As shown in FIG. 37, spreading the jaws 30, 31 apart deforms the first face F1 and the second face F2 of the container, by arcuating outwardly. The concavity of the first face F1 (inside side of the container) forms the first interspace It1 then enabling the insertion and the descent of the first jaw 30, and the concavity of the second face F2 (inside side of the container) forms the second interspace then enabling the insertion of the second jaw 31.

Thus and in /d/, the insertion of the first jaw 30 of the motor-driven clamp between the first face F1 of the container and the first case Et1 of the row and, the insertion of the second jaw 31 of the clamp between the last case Et2 of the row and the second face F2 of the container are performed through the descent of the first jaw and of the second jaw respectively in the first interspace It1 and the second interspace It2. During this descent, it is advantageously possible to progressively approach the two jaws, the first jaw 30 and second jaw 31, and until seizing up the row of cases when the two jaws are immersed into the container at the low end-of-stroke, and as illustrated for indication in FIG. 20.

Figure 39:
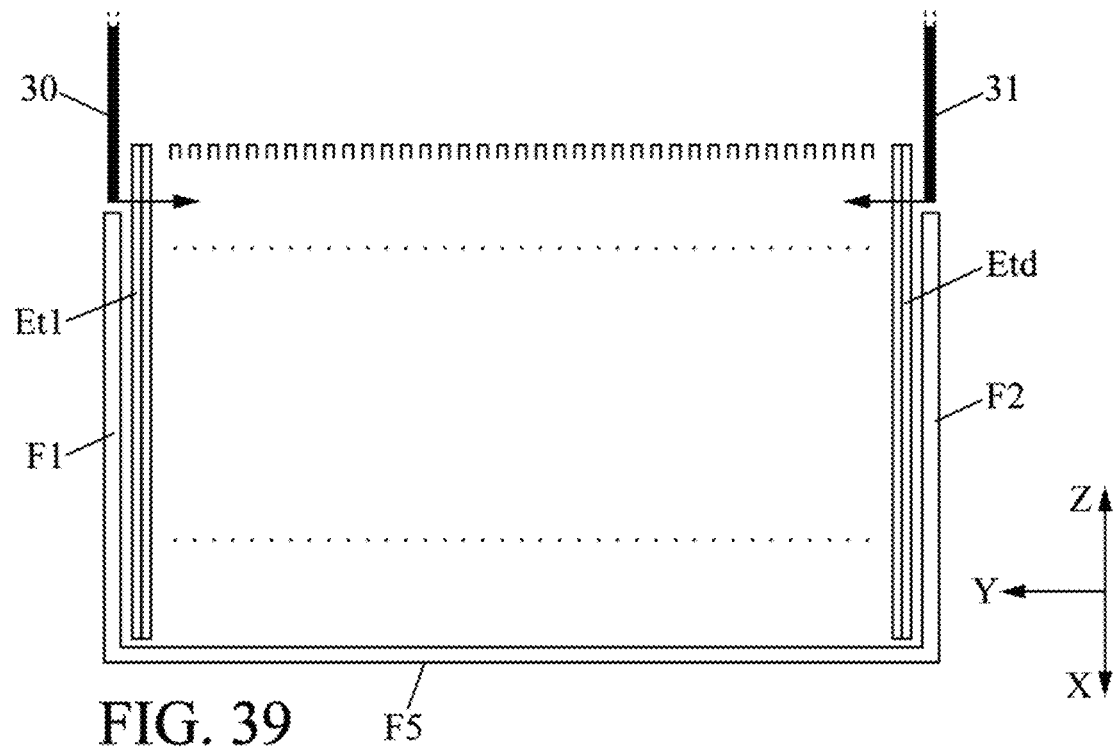
FIG. 39 is a view of the open container, of FIG. 35 according to a vertical sectional plane, illustrating the two jaws of the motor-driven clamp bearing respectively on protruding portions of the first case and of the last case and according to a second embodiment of the method during the insertion of the jaws, and in order to create a first interspace between the first face of the container and the first case, and a second interspace between the second face of the container and the last case when the jaws are partially brought close to each other.
Figure 40:
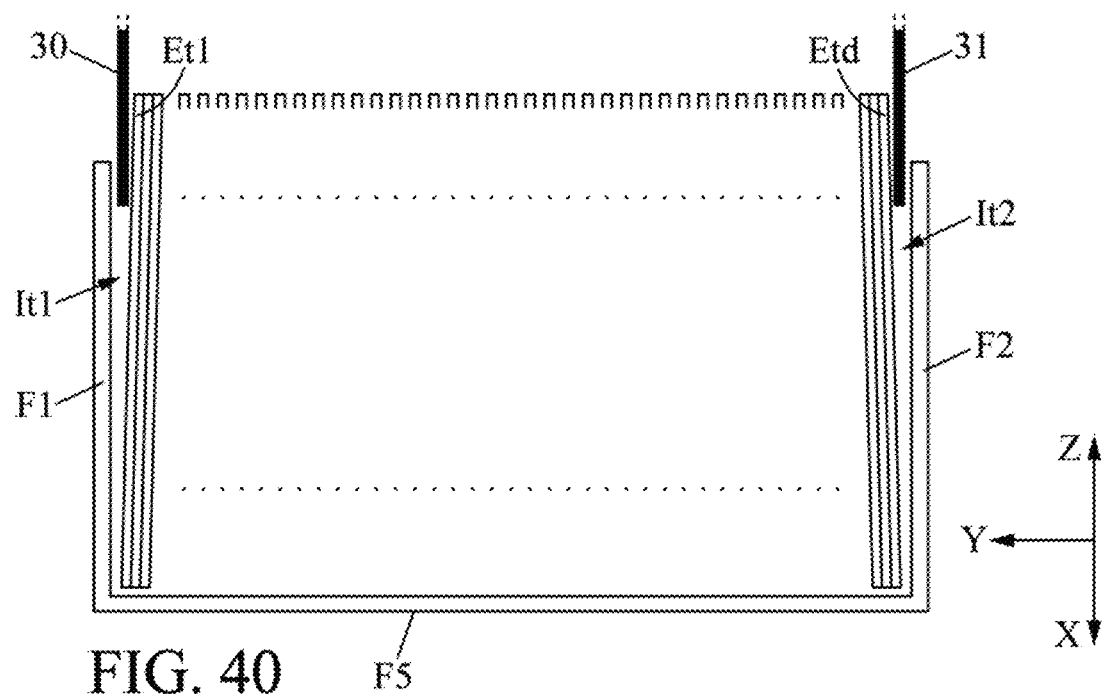
FIG. 40 is a view of the open container, of FIG. 39 after creation of the two interspaces, illustrating the descent of the first jaw and second jaw in the two interspaces, the first and second interspaces.

A second possibility for forming the interspaces It1 and It2 is illustrated in FIGS. 39 and 40.

According to this second possibility, the cases of the row of cases, including the first case and the last case of the row, having a protruding portion, on the side of the opening, the cases extending in height beyond the upper edge of the first face and the upper edge of the second face of the container then open.

In FIG. 39, it should be noticed that the first case It1 extends in its laid-flat position, from the bottom of the container, bearing on the latter and throughout the opening of the container. An upper portion of the case It1 projects above the first face F1 of the container. Similarly, the last one ltd extends in its laid-flat position, from the bottom of the container, bearing on the latter and throughout the opening of the container. An upper portion of this case ltd projects above the second face F2 of the container.

It is possible to obtain the cases thus protruding from the opening of the container, for example when the robotic arm implements a peripheral cut along the first, second, third and fourth faces of the container, and at a cut level located below the cases when these rest on the fifth face F5 forming the bottom of the container Ca. Such a peripheral cut is described in the present disclosure.

According to this second possibility, the method provides, prior to /d/, for:
the positioning of the distal ends respectively of the first jaw 30 and of the second jaw 31 facing the protruding portions of the first case Et1 and of the last case Etd of the row,
the control of the actuation mechanism to bring the two jaws of the clamp close to each other so as to bring the two jaws of the clamp partially close to each other so as to tighten the first case and the last case of the row of cases, without seizing up the row of cases, while creating, on the one hand, a first interspace Et1 between the first face F1 and the first case Et1 of the row, and, on the other hand, a second interspace It2 between the last case Etd and the second face F2 of the container.

Thus, and in FIG. 39, the control of the first jaw 30 and of the second jaw 31 according to the arrow direction ensures a partial compression of the row which allows creating the two interspaces It1 and It2, this tightening being nonetheless insufficient per se to seize up the row of cases.

Thus, at /d/, the insertion of the first jaw 30 of the clamp between the first face 30 of the container and the first case Et1 of the row and, the insertion of the second jaw of the clamp 31 between the last case Etd of the row and the second face F2 of the container are performed through the descent of the first jaw 30 and of the second jaw 31 respectively in the first interspace It1 and the second interspace It2. During this descent, it is advantageously possible to progressively bring the first jaw and second jaw close to each other, and until seizing up the row of cases when the two jaws are immersed in the container in the low end-of-stroke.

Figure 41:
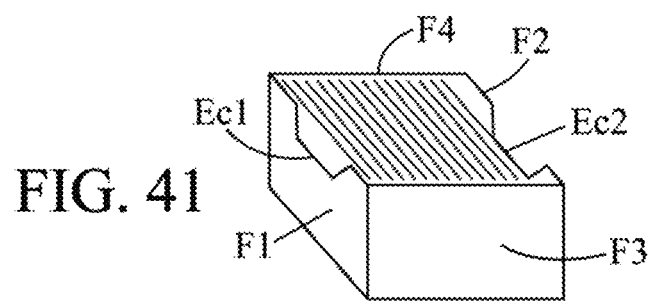
FIG. 41 is a view of the open container, in perspective provided with a first notch and with a second notch, enabling the passage through the ends of the jaws for the implementation of the step of bringing the jaws close to each other illustrated in FIG. 39.

According to a third possibility, the first face F1 and the second face F2 of the container having on the side of the opening of the open container, respectively a first notch Ec1 and a second notch Ec2, opening on the side of the opening. Thus, and in FIG. 41, it should be noticed that the container provides for a notch Ec1, opening at the opening, on the first face F1 and a second notch Ec2 opening at the opening on the second face. These notches Ec1 and Ec2 have a sufficient dimension to be crossed by the distal ends of the first and second jaws 30, 31.

According to this third possibility, the method provides, prior to /d/, for:
the positioning of the distal ends respectively of the first jaw and of the second jaw facing one another outside the container, respectively opposite the first notch Ec1 and the second notch Ec2,
the control of the mechanism to bring the two jaws 30, 31 of the clamp partially close to each other, throughout the notches Ec1, Ec2, so as to tighten the first case Et1 and the last case Et2 of the row, without seizing up the row of cases, while creating, on the one hand, a first interspace Et1 between the first face F1 and the first case Et1 of the row, and, on the other hand, a second interspace It2 between the last case Etd and the second face F of the container.

Thus, and like in FIG. 39, the control of the first jaw 30 and of the second jaw 31 according to the arrow direction ensures a partial compression of the row which allows creating the two interspaces It1 and It2, this tightening being nonetheless insufficient per se to seize up the row of cases.

Thus, and at /d/, the insertion of the first jaw 30 of the motor-driven clamp between the first face 30 of the container and the first case Et1 of the row and, the insertion of the second jaw of the clamp 31 between the last case Etd of the row and the second face F2 of the container are performed through the descent of the first jaw 30 and of the second jaw 31 respectively in the first interspace It1 and the second interspace It2. During this descent, it is advantageously possible to progressively bring the two jaws, the first jaw and second jaw, close to each other and until seizing up the row of cases when the two jaws are immersed in the container at the end-of-stroke.

Thus, and according to the first three possibilities, it is possible to use the two jaws, the first jaw 30 and second jaw 31, of the motor-driven clamp to create the two interspaces It1 and It2, prior to the insertions of the two jaws in these interspaces.

According to another possibility, these first and second interspaces It1 and It2 could be created with a means distinct from the motor-driven clamp. For example and according to a fourth possibility illustrated in FIGS. 42 and 43, the method provides, prior to /d/, for:
- a first tilt-up of the open container so that gravity accumulates the cases of the row against one of the faces consisting of the first face F1 of the container or the second face F2 of the container, and while creating an interspace (It1 or It2) between the other face consisting of the second face or the first face, and while inserting the distal end of one of the two jaws 30, 31 in this interspace (It1 or It2),
- a second tilt-up of the open container so that gravity accumulates the cases of the row against the other one of the faces consisting of the second face F2 or the first face F1, and while creating another interspace (It2 or It1) between said one face, and while inserting the distal end of the other one of the two jaws 30, 31 in this other interspace.

Figure 42:
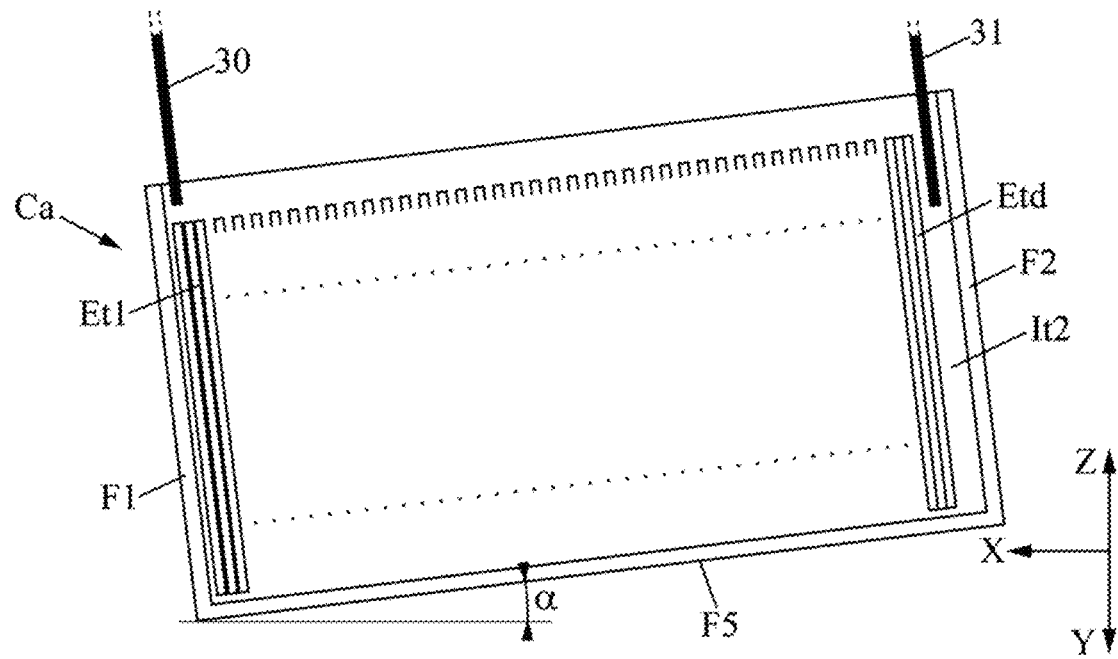
FIG. 42 is a view of the open container, of FIG. 35 according to a vertical sectional plane, illustrating the tilt-up of the container in a first direction in order to create, by gravity, an interspace between the last case and the second face of the container, enabling the insertion of the second jaw, while the first jaw is not inserted.

For example, and in FIG. 42, the first tilt-up by an angle α of the container about a parallel axis Y allows tilting the container, and so that the cases accumulate while being tightened against the first face F1 of the container, which generates the second interspace It2 between the last case Etd and the second face F2. The distal end of the second jaw 31 is immersed in this second interspace It2.

Figure 43:
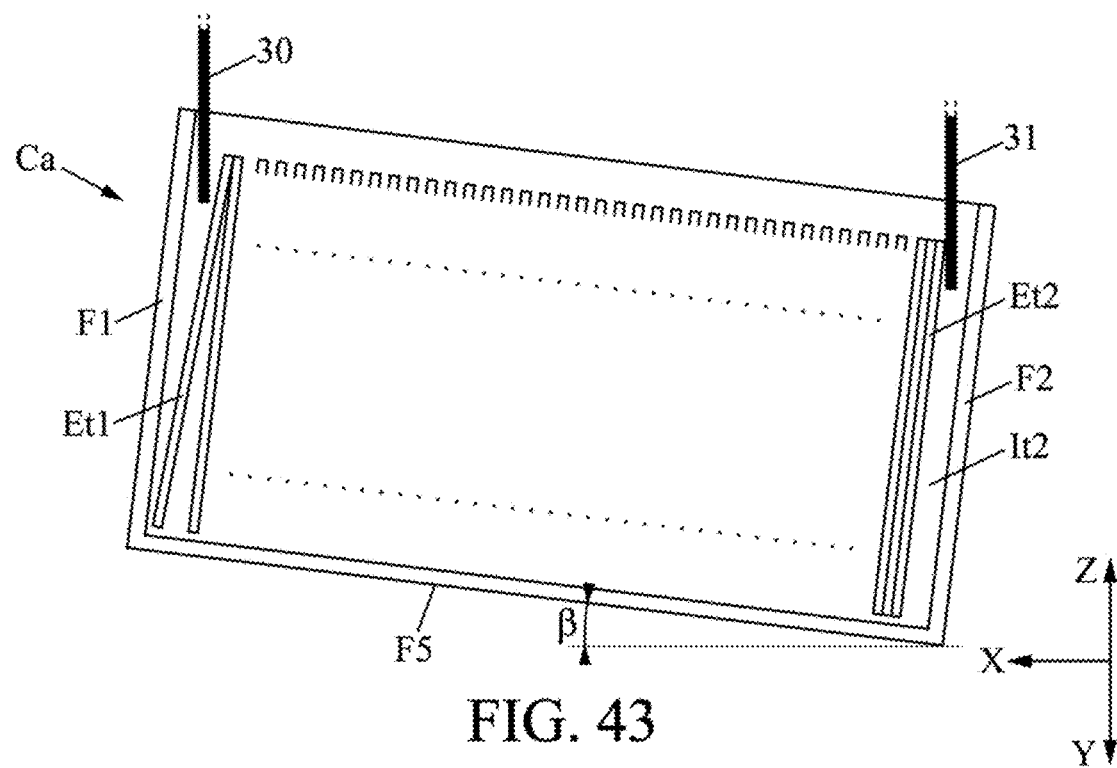
FIG. 43 is a view of the open container, of FIG. 35 according to a vertical sectional plane, after the tilt-up of the container in a second direction, in order to create, by gravity, an interspace between the first case and the first face of the container, enabling the insertion of the first jaw, while the second jaw is already inserted in the interspace between the last case and the second face.

Afterwards, and in FIG. 43, the second tilt-up by an angle β about an axis of rotation parallel to the Y axis allows tilting the container in the reverse direction and so that the cases accumulate while being tightened against the second face F2 of the container, which generates the first interspace It1 between the first case Et1 and the first face F1. The distal end of the first jaw 30 is immersed in this second interspace It2 and while the end of the second jaw 31 is already present in the first interspace It1.

Thus, and according to this fourth possibility, at /d/, the insertion of the first jaw of the clamp between the first face of the container and the first case of the row and, the insertion of the second jaw of the clamp between the last case of the row and the second face of the container are performed afterwards through the descent of the two jaws in the container. During this descent, it is advantageously possible to progressively bring the two jaws, the first jaw and second jaw, close to each other and until seizing up the row of cases when the two jaws are immersed into the container at the end-of-stroke.

The first tilt-up and the second tilt-up of the container could herein be implemented by a tilter on which the container rests.

According to one embodiment, the method may provide, prior to /d/ and /e/, for the opening of the container when the container rests on a surface through the fifth face F5 of the container by:
- /c/ piloting the robotic arm so as to open or remove the sixth face F6 of the container forming a lid.

According to one embodiment (not illustrated), and when the container is a cardboard box, the sixth face of the container forming a lid, could result from the closure of several flaps of the cardboard box, kept closed in particular by an adhesive tape. The robotic arm could then be piloted so as to remove the adhesive tape, and then raise, one-by-one, the closure flaps to proceed with opening of the container. This opening solution allows preserving the integrity of the container, in particular of the cardboard box, which could allow, once the container is emptied of the cases, folding it flat in particular by the robotic arm, during the evacuation thereof.

According to another advantageous solution, limiting the cycle time, it is possible to remove the sixth face F6 of the container forming the lid, through the implementation of a peripheral cut, which allows in particular removing the lid in one-piece, and advantageously without having to remove the adhesive tape and open one-by-one the closure flaps when these are present.

According to one embodiment, this peripheral cut may be implemented by the robotic arm itself. To this end, the gripping system 2 handled by the robotic arm 1 comprises a cutting member 4. At /c/, the robotic arm handling the cutting member 4 is piloted so that the cutting member performs a continuous peripheral cut along the first, second, third and fourth faces of the container, and so as to enable the removal of the sixth face F6 forming a lid.

Figure 15:
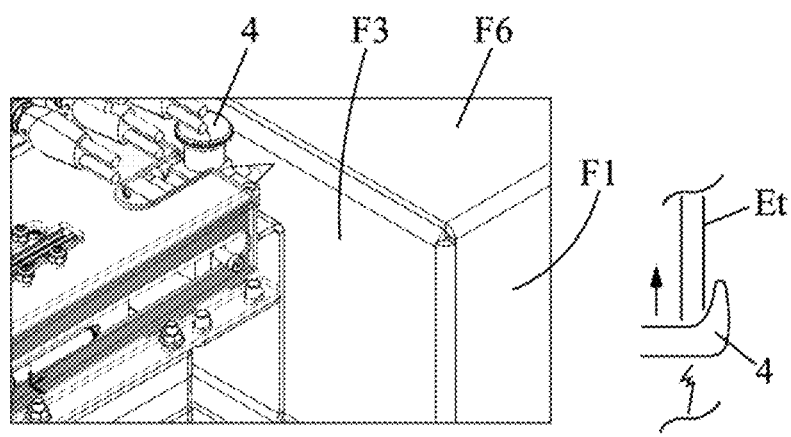
FIG. 15 is a view consecutive to FIG. 14 after wedging of the container, the robotic arm handling a cutting tool, in this instance a hook blade so as to perform a continuous peripheral cutting path, ensuring the detachment of the lid.

The cutting member 4 may consist of a blade, in particular a cutter-type one, and having a hook-like shape, as illustrated to the right in FIG. 15. This hook-like shape and the blade avoid marking the case inside the container, when the cutting tool 4 ensures the peripheral cut (as shown to the left in FIG. 15).

According to one embodiment, and consecutively to /c/, the robotic arm 1 is piloted so as to grasp the lid detached by the peripheral cut, then to evacuate said lid.

According to one embodiment, the gripping system 2 may comprise a vacuum gripper 7. This vacuum gripper 7 could enable the robotic arm to grasp the lid detached by the peripheral cut, and then evacuate it as illustrated for indication in FIG. 16.

Figure 24:
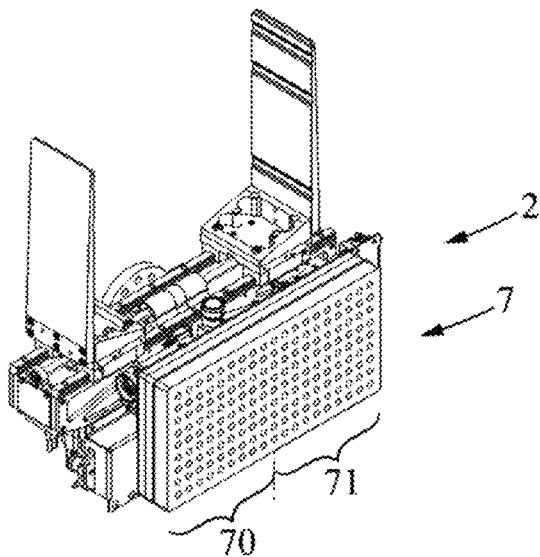
FIG. 24 is a detail view of the gripping system, oriented so as to illustrate the dual-zone vacuum gripper.

Advantageously, the vacuum gripper may consist of a dual-zone gripper, with two independent grasping areas 70, 71, and as marked as example in FIG. 24.

When the container receiving the row of cases comprises a protective sheet Fp (cf. FIG. 17) disposed inside the container, interposed between the lid and the cases, this dual-area gripper allows reducing the cycle time of the evacuation of the lid and of the case.

Figure 18:
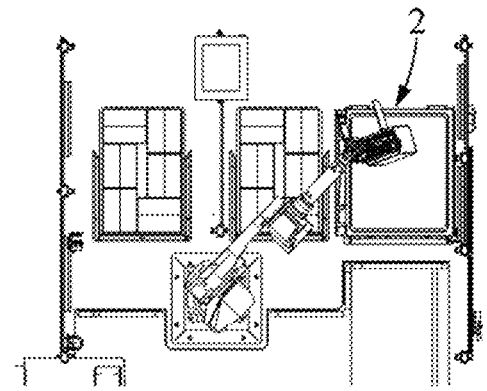
FIG. 18 is a view consecutive to FIG. 17, the vacuum gripper of the robotic arm ensuring setting of the interlayer and/or of the lid in a rubbish bin.

Grasping of the lid detached by the peripheral cut is ensured by one of the two areas 70, 71 of the vacuum gripper, and the protective sheet Fp is grasped, by the other one of the two areas 70, 71 of the vacuum gripper 7, before evacuating the lid and the protective sheet together by the robotic arm grasped by the two areas of the vacuum gripper 7. The joint evacuation of the lid and of the protective sheet requires only one movement of the robotic arm 1. The robotic arm then releases the lid, or the protective sheet in a rubbish bin and as shown in FIG. 18.

According to one embodiment, said installation comprises a positioning table 5, comprising a setting plane extending according to the directions X and Y, said positioning table 5 comprising stops 50 cooperating with at least two perpendicular faces of the container ensuring wedging of the container and wherein the insertions of the jaws of the clamp according to /d/, and/or opening of the container according to /c/ are performed after wedging of the container by the stops according to the directions X and Y.

The primary function of the positioning table is to ensure wedging of the container in a determined position with respect to the robotic arm.

According to one embodiment, said automated installation comprises at least one area Z1, Z2 for storing the containers stacked on top of each other on a pallet, and wherein it is proceeded with loading of the positioning table by:
- /b/ grasping of a container stacked on the pallet by the robotic arm 1 then piloting of the robotic arm to proceed with setting of the container Ca on the positioning table 5.

Grasping of the container by the gripping system could be obtained by the vacuum gripper. In the case of a dual-zone 70, 71 gripper 7, the two independent areas 70, 71 could be activated to maximise safety of grasping.

Figure 1:
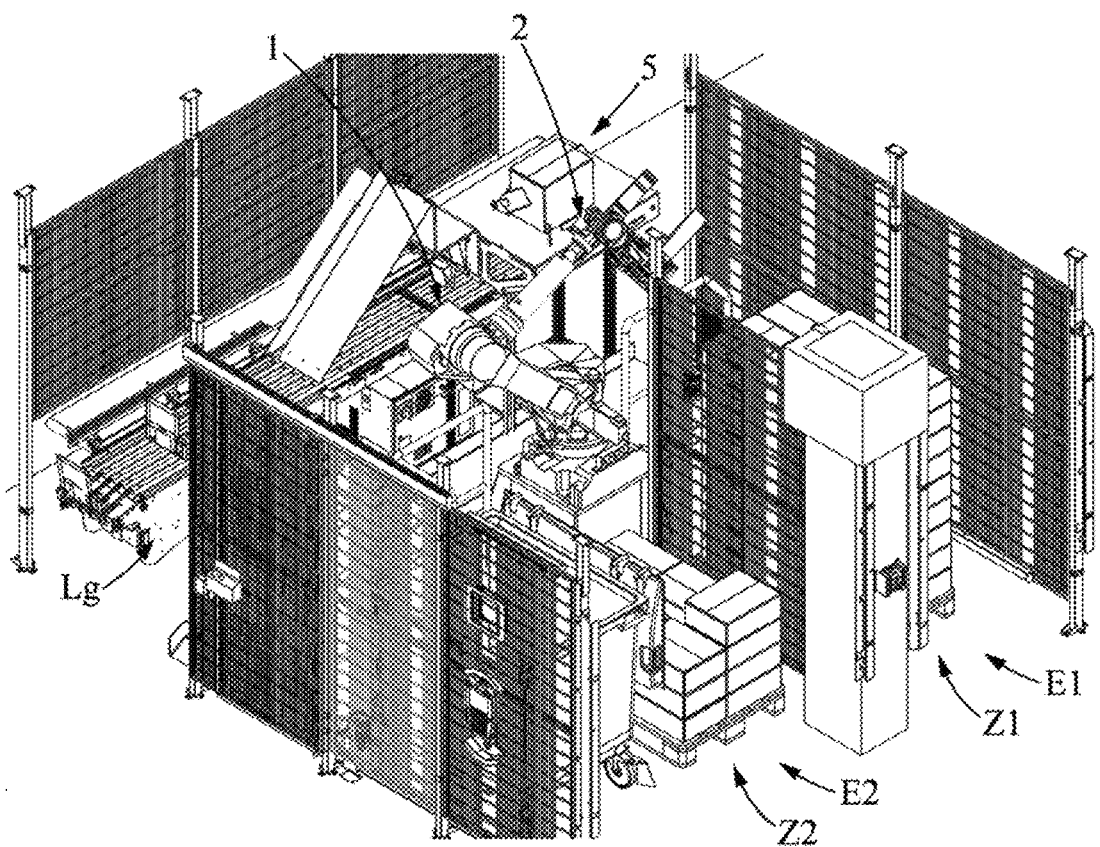
FIG. 1 is a perspective view illustrating the robotic installation object of the method according to the present disclosure, said installation comprising, in a secure and wall-protected area, a robotic arm handling a gripping system, a positioning table, two storage areas, each receiving a pallet of containers with cases, the robotic arm being configured to grasp a container in either one of the two storage areas, set it on the positioning table, open the container, then grasp all of the cases forming a row of cases inside the open container, before extracting the cases and setting them on a conveyor of a packaging line, received in the secure area.

Thus, FIG. 1 illustrates, as example, a robotic installation that comprises the robotic arm 1, the positioning table 5 and two storage areas Z1 and Z2, each receiving containers stacked on a pallet.

Each storage area Z1 or Z2, or more generally said at least one storage area may comprise a frame anchored to the ground ensuring positioning of the pallet in a determined position with respect to the robotic arm 1, and to the positioning table.

This frame comprises a U-liked shape which could be formed by three metallic beams, anchored to the ground respectively forming the three flanges of the U. The opening of the U of the frame is oriented towards the entrance of the storage area.

Figure 2:
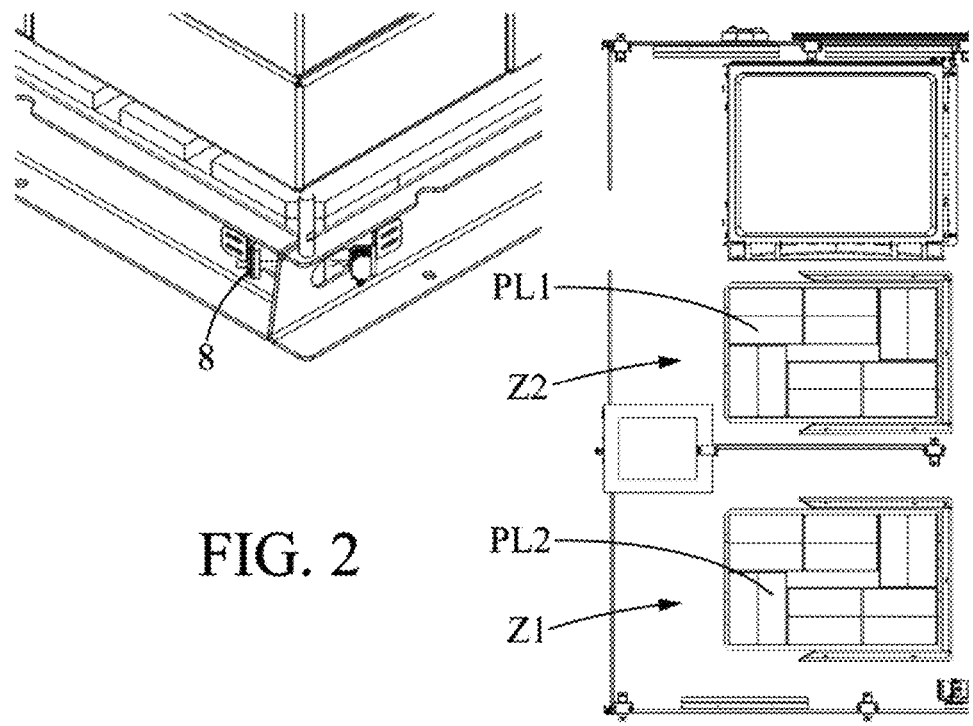
FIG. 2 illustrates, to the right, a top view of two U-shaped positioning frames, anchored to the ground, respectively configured to ensure the positioning of two pallets in the two storage areas and, to the left, a detection system checking up the proper positioning of the pallet in the U-shaped frame, by detection of a corner of the pallet at an angle of the frame.
Figure 30:
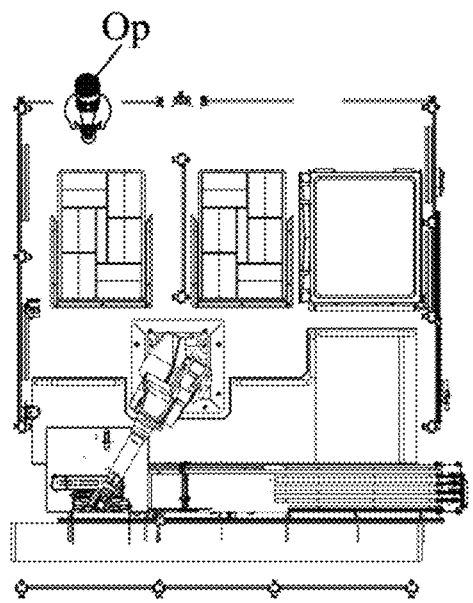
FIG. 30 is a top view of the installation, as illustrated in FIG. 29, when an operator comes into the monitored area associated to the first storage area, a monitoring module preventing the robotic arm from working in the first storage area, the monitoring module enabling the arm to work in the second storage area, as long as no intrusion is detected in this area.

During loading, an operator can move the containers, typically using a forklift and slip the pallet between the two parallel flanges of the U, until abutment of the pallet with the bottom flange of the U frame and as shown to the right of FIG. 2, and as shown in FIG. 30.

A detection system 8 could check up the proper positioning of the pallet in the U-shaped frame, by detection of a corner of the pallet at an angle of the frame. Thus, and in the left-side view, in FIG. 2, the corner of the pallet at an angle of the U-shaped frame interrupts a detection beam of the detection system. The interruption of the detection beam is interpreted as a proper positioning of the pallet.

It should also be noticed that the pallet, which could be an EPAL/EURO pallet, having a length dimension larger than its width dimension, and that the U-shaped frame receives the pallet within an interlocking clearance, and according to two possible directions of the pallet only. Regardless of the possible directions of the pallet, the longitudinal axis of the pallet passes through a plane of symmetry of the U-shaped frame.

Figure 25:
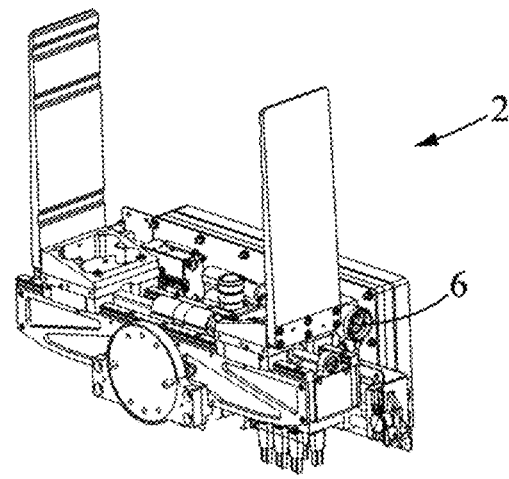
FIG. 25 is a view of the gripping system, according to FIG. 24, oriented so as to illustrate the camera.
Figure 26:
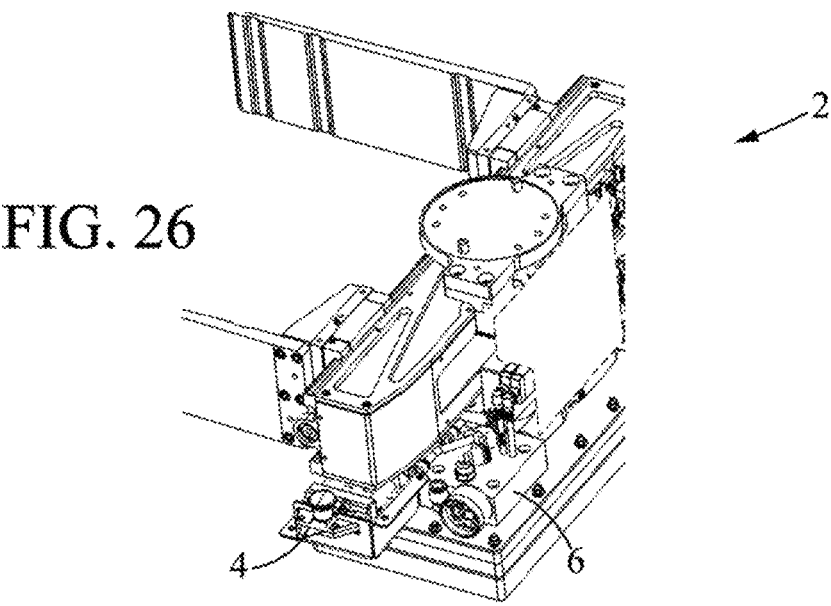
FIG. 26 is a view of the gripping system, according to FIG. 24, oriented so as to illustrate the cutting tool, in the form of a hook-like blade.
Figure 31:
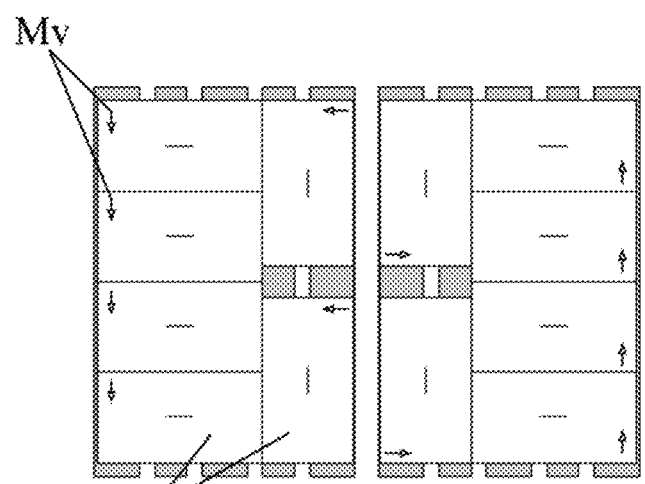
FIG. 31 is a top view of the containers positioned on a pallet, to the left, in a first possible direction of the pallet, to the right, in the other possible direction of the pallet, the direction of the pallet being identifiable by the visual markings of the containers.
Figure 32:
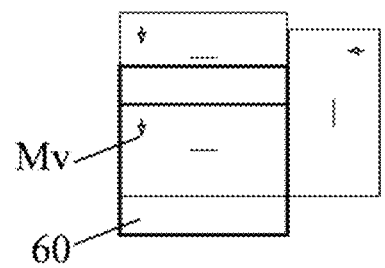
FIG. 32 is a top view of the containers positioned on a pallet, with a schematisation of the field of view on the camera targeting a container of the pallet, including its visual marking in the form of an arrow.

FIG. 31 illustrates the superimposition of the containers on the pallet, and according to two possible directions enabled by the U-shaped frame. It should be noticed that each of the containers has a visual marking Mv, in this instance an arrow, which allows determining the orientation of the pallet and, on the other hand, the orientations of each container Ca. To this end, the gripping system 2 is equipped with a camera 6, shown in FIG. 25.

Prior to /b/, it is proceeded with the recognition of the container by:
- /a/ piloting of the robotic arm handling the gripping system so as to target the visual marking Mv of a container stocked at the top of the stack in the field of view 60 of the camera 6, and wherein said installation having:
- a recognition module configured to recognise the visual marking Mv of the image targeted by the camera 6 and to determine the angle of the visual marking Mv of the container in the reference frame of the positioning table 5, and
- a computing module configured to generate, from the angle of the marking determined by the recognition module, guide instructions to ensure at /b/, grasping of the targeted container in the field of the camera and setting of the container on the positioning table according to a determined orientation of the visual marking in the reference frame of the positioning table 5.

Thus, setting of the container on the positioning table 5 is ensured, in a determined orientation of the container, and therefore of the row of cases.

According to one embodiment, and depending on the direction of the containers of the pallet, and therefore of the cases inside the containers, it might be necessary to proceed with a turnover of the containers. According to one embodiment, it is proceeded with the turnover of the container by 180° between grasping of the container in /b/, on the one hand, for which grasping of a container stacked on the pallet is ensured by the robotic arm and then piloting of the robot to proceed with setting of the container on the setting table and, on the other hand, wedging of the container according to the directions X and Y on the stops 50 of the positioning table 5.

According to one embodiment, illustrated in FIGS. 9 to 14, the turnover of the container by 180° is ensured for one part, in /b/ by the robotic arm during setting of the container Ca on the positioning table 5, and for the other part by a tilter 51 controlled by an actuator equipping the positioning table 5. For example, the robotic arm allows pivoting the container by 90°, the remaining 90° for ensuring the turnover of the container by 180° being ensured by a tilter 51 of the positioning table 5.

Figure 9:
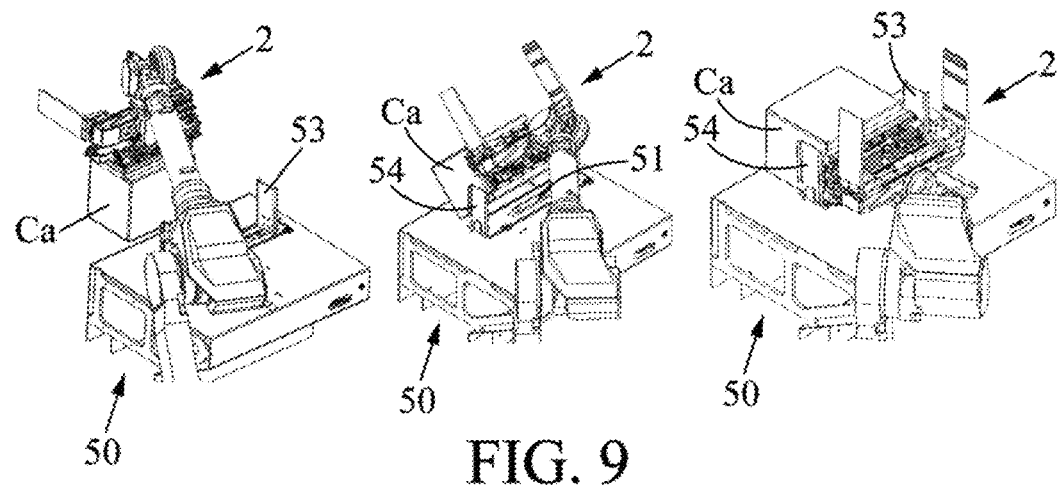
FIG. 9 shows in three views the decomposition of the 90° turnover of the container by the robotic arm.
Figure 10:
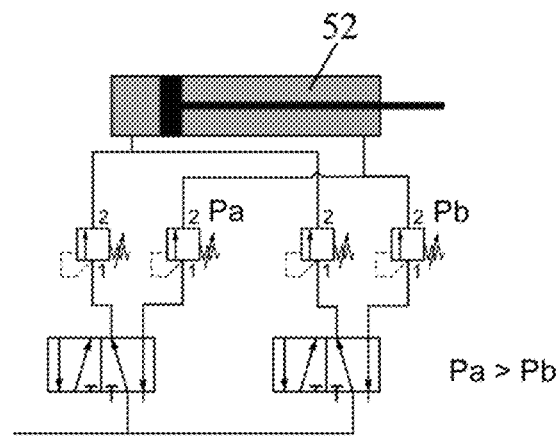
FIG. 10 shows a fluid diagram of the cylinder controlling a movable jaw of a fixed jaw/movable jaw pair carried by a tilter of the positioning table, the fluid circuit enabling in particular tightening of the clamp according to two distinct pressures Pa and Pb.

Thus, and in the three views of FIG. 9, it should be noticed that the gripping system makes the container Ca pivot by 90° (from the left-side view up to the right-side view).

The container thus set lies between a movable jaw 53 and a fixed jaw 54 of a tilter 51. The frame of the tilter is then received in a window of the setting plane of the positioning table 5, the frame extending the positioning table 5 in this state of the tilter 51. A double-acting cylinder 52 is then controlled so as to close the jaws 53, 54 on the container. The valves of the fluid circuit are controlled so that the piston of the cylinder is subjected to a pressure Pa (low).

Figure 11:
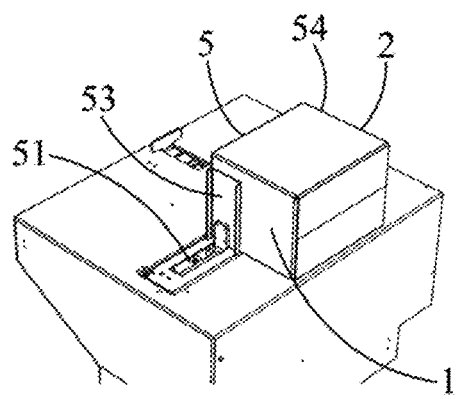
FIG. 11 is a view consecutive to FIG. 9 showing the container turned over by 90° by the robotic arm, after grasping the container by approaching the two jaws of the tilter, the piston of the cylinder being subjected to a pressure Pa ("high").
Figure 12:
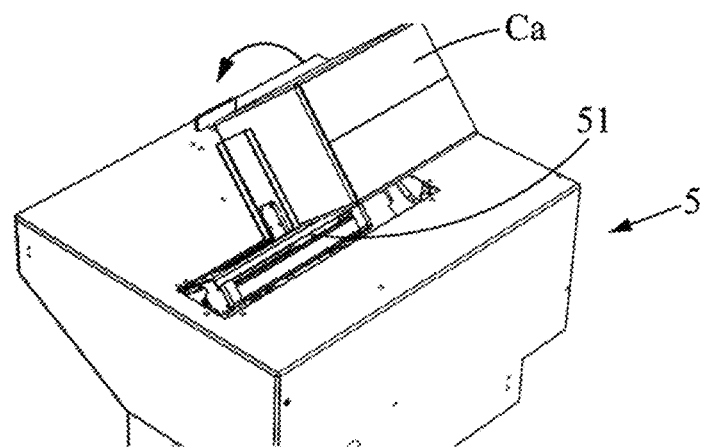
FIG. 12 is a view consecutive to FIG. 11 showing the container grasped by the jaw of the tilter, turned over by 90° by the tilter by the action of a turnover cylinder.

The container Ca is then seized up by the jaws 53, 54 of the tilter and as shown in FIG. 11, then the frame of the tilter, including the jaws 53, 54 are tilted by 90°, as shown in FIG. 12.

The jaws 53, 54 of the tilter are spread apart thanks to the double-acting cylinder, then a movable stop 50 is brought to wedge the container against the frame of the tilter 51, then projecting from the plane of the table in this state of the tilter, and before the jaws 53, 54 of the tilter are brought again close to each other to ensure grasping and wedging of the container. During this second closure of the movable and fixed jaws 53, 54, the valves of the fluid circuit are controlled so that the piston of the cylinder is preferably subjected to a pressure Pb, lower than the pressure Pa. The jaws 53, 54 then bear against the first face F1 and the second face F2 of the container and as should be understood from FIG. 19, yet with a controlled pressure, and in order to facilitate the extraction of the cases by the robot.

According to an advantageous embodiment, said installation may comprise two areas Z1, Z2 for storing the containers consisting of a first storage area Z1 and a second storage area Z2 each receiving containers Ca stacked on a pallet (PL1 or PL2), each of the storage areas, accessible by the robotic arm 1 for the implementation of /b/.

These two storage areas Z1, Z2 are separated by a physical barrier or a virtual monitoring barrier, the two storage areas respectively having two independent entrances E1, E2 for an operator Op and in order to enable loading of the areas Z1 and Z2 in an independent manner.

Said installation comprises means for detecting an intrusion of the operator, configured to detect, while distinguishing them, an intrusion in the first storage area Z1 and in the second storage area Z2.

Advantageously, the module for piloting and controlling the robotic arm is configured to work in masked time in one of the two storage areas Z1, Z2, possibly at a reduced speed, when an intrusion is detected in the other storage area. This enables the robot to continue working in masked time in one of the storage areas Z1 or Z2 and when the operator intervenes in the other storage area, for example for loading thereof.

Example of an Operating Cycle of the Robotic Installation

Figure 3:
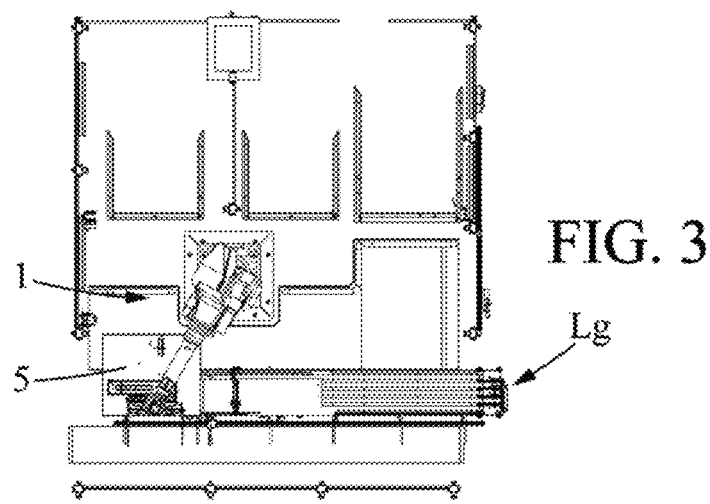
FIG. 3 is a view of the installation at the beginning of the cycle, the robot in the standby position, leaving the first storage area and the second storage area, then empty, free to enable an operator to come in and load the storage areas with a pallet.
Figure 23:
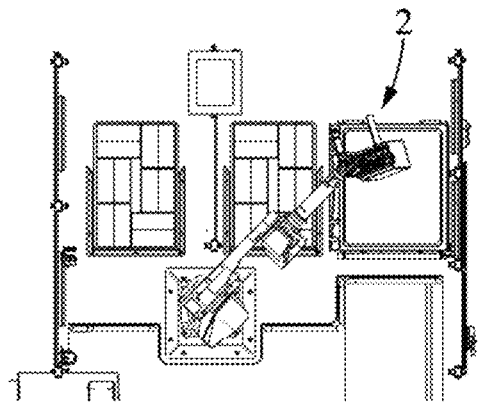
FIG. 23 is a view consecutive to FIG. 22, for which the robotic arm having grasped the empty container; evacuated it and set it in a rubbish bin, illustrating the end of the cycle.

We will describe in detail a full operating cycle of the robotic installation that is illustrated in FIG. 3 up to FIG. 23.

In FIG. 3, the robot is in the standby position in the area Z3, so as to enable the operator to load the first storage area Z1 or the second storage area Z2, then empty.

Figure 4:
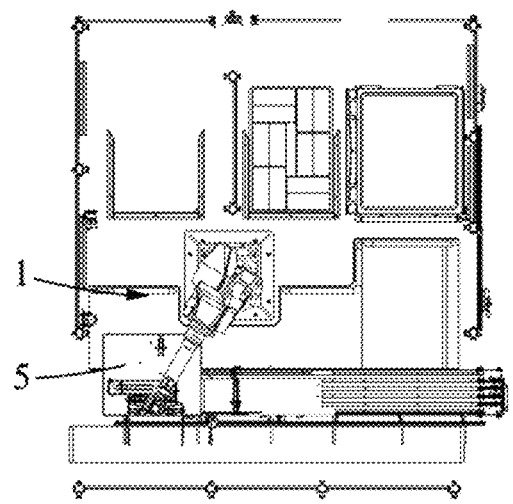
FIG. 4 is a view consecutive to FIG. 3, after loading of the storage area (to the right) with a pallet of containers, the pallet being positioned in the frame anchored to the ground.

In FIG. 4, an operator has placed a pallet with containers Ca in the U-shaped frame of the second storage area, as well as a rubbish bin.

Figure 5:
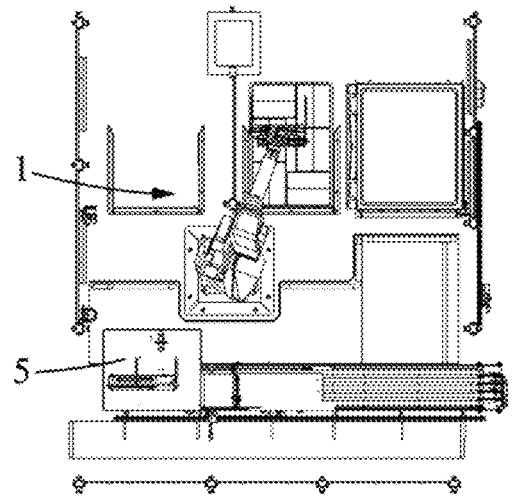
FIG. 5 is a view consecutive to FIG. 4 illustrating the movement of the robotic arm scanning the top of the pallet in the storage area to check up the presence of the containers on the pallet.

In FIG. 5, the robotic arm uses an AON (all or nothing) sensor present on the gripping system 2 to check up the presence of the containers on the first layer of containers of the pallet.

Figure 6:
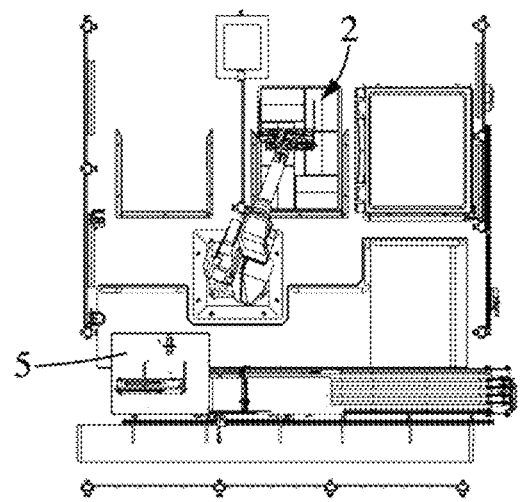
FIG. 6 is a view consecutive to FIG. 6, for which the robotic arm positions in the field of view of the camera a container provided with a visual marking, and in order to determine the direction of the pallet.

In FIG. 6, the robotic arm captures an image of the first container that it finds in the field of view 60 of the camera 6, according to /a/ which enables a computing module of the installation to determine the direction of the pallet, and to determine the orientation of the container Ca.

Figure 7:
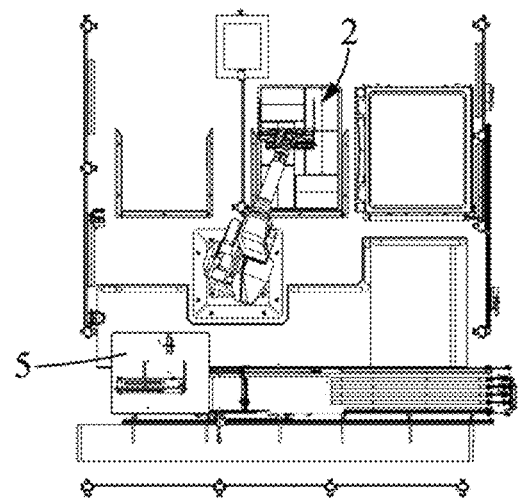
FIG. 7 is a view consecutive to FIG. 6 for which, the robotic arm grasps a first container by a vacuum gripper.
Figure 8:
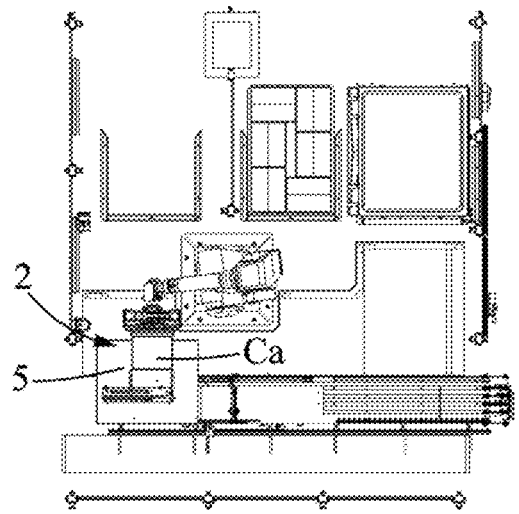
FIG. 8 is a view consecutive to FIG. 6 for which the robotic arm sets the container on the positioning table, by proceeding with a turnover of the container by 90°.

In FIG. 7, the robotic arm uses the vacuum gripper 7 to seize up the container Ca, then the robotic arm is piloted so as to set the container Ca on the positioning table 5 in FIG. 8, in a determined orientation of the container, and according to /b/.

During this setting, and as illustrated in FIG. 9 (from the left to the right according to the three views), the robotic arm proceeds with a pivoting of the container by 90°.

The container is then set between a fixed jaw 54 and a movable jaw 53, above the frame of the tilter 51 which is received in a window of the setting plane of the positioning table 5. In this state of the tilter, the frame received in the window extends the setting plane of the positioning table 5.

In FIG. 11, the movable jaw 53 is constrained by a cylinder subjected to a pressure Pa towards the fixed jaw 54 of the tilter 51, which allows seizing up the container Ca firmly for pivoting thereof by the tilter 51.

In FIG. 12, the frame of the tilter 51 is actuated to rotate by 90°, by a turnover cylinder which allows obtaining a turnover of the container by 180°, ensured for one part, in /b/ by the robotic arm during setting of the container and as illustrated in FIG. 9, and for the other part by a tilter 51 controlled by a turnover actuator (not illustrated) equipping the positioning table 5, and as illustrated in this FIG. 12.

Figure 13:
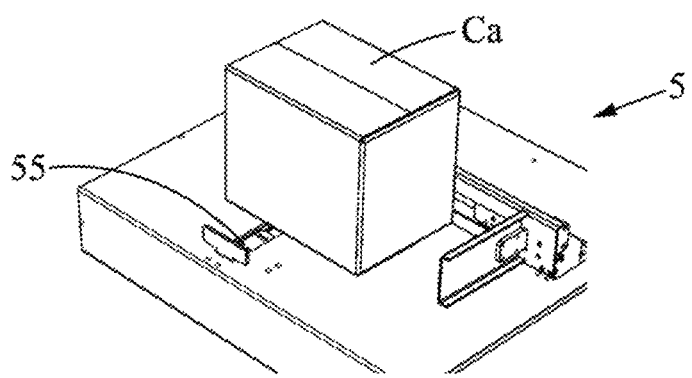
FIG. 13 is a view consecutive to FIG. 12, the jaws of the tilter controlled to spread apart, by control of the movable jaw.
Figure 14:
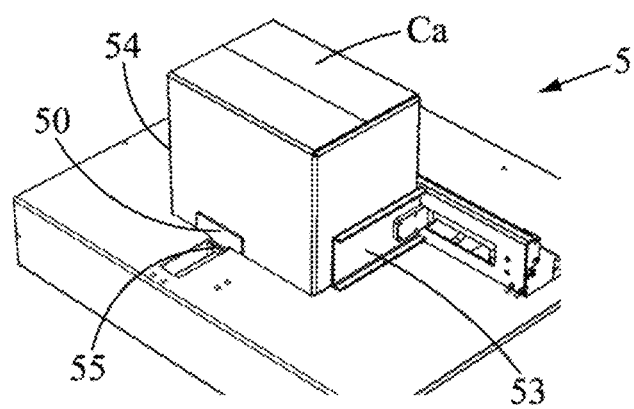
FIG. 14 is a view consecutive to FIG. 13 after wedging, by a movable stop constraining the container to abut against the frame of the tilter, then the closure of the jaws of the tilters when the movable jaw is controlled for closure, the piston of the cylinder controlling the movable jaw subjected to a pressure Pb (low), namely lower than the pressure Pa.

In FIG. 13, the jaws 53 and 54 of the tilter release the container, then a movable stop 55 is brought to wedge the container against the frame which is then projecting from and perpendicular to the setting plane of the positioning table 5 in this state of the tilter 51, and before the actuator 52 proceeds again with closure of the jaws 53, 54 as illustrated in FIG. 14. During this new grasping, the piston of the actuator 52, is subjected to a pressure Pb, lower than Pa.

In FIG. 15, and according to /c/, the robotic arm is piloted so as to remove the second face F6 from the container forming a lid, thanks to a cutting tool 6, in this instance a hook-like shaped blade which performs a peripheral cut along the first F1, second F2, third F3 and fourth F4 faces of the container Ca.

Figure 16:
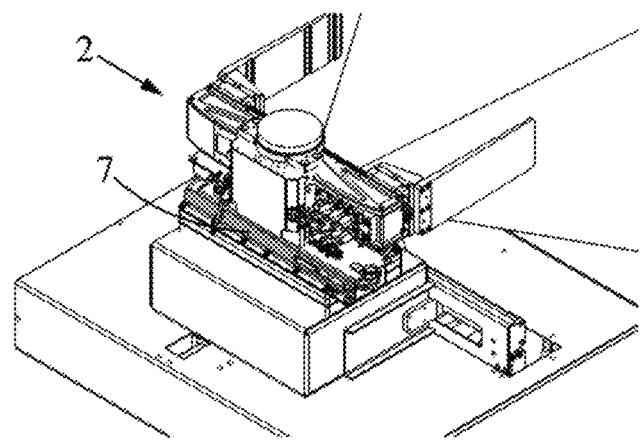
FIG. 16 is a view consecutive to FIG. 15 after grasping of the lid by the vacuum gripper of the robotic arm, the lid being detached from the base of the container.
Figure 17:
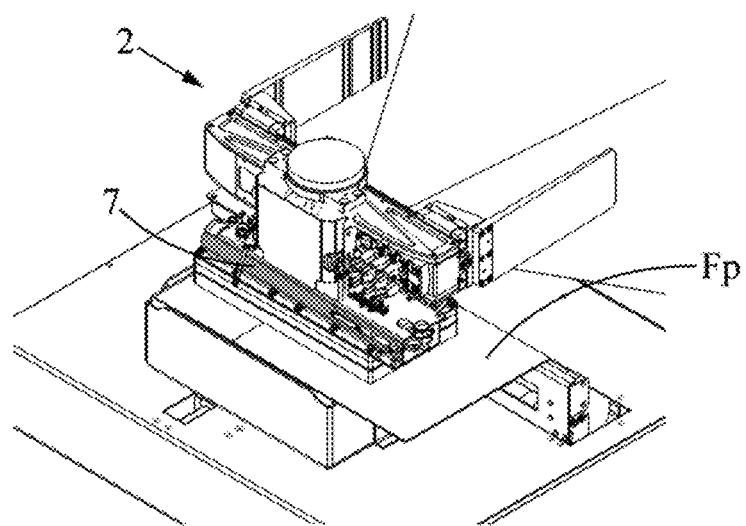
FIG. 17 is a view consecutive to FIG. 16, the vacuum gripper of the robotic arm ensuring grasping of a protective sheet, interposed between the lid of the container and the row of cases.

In FIG. 16, the vacuum gripper 7 seizes up the lid detached by the cut performed in /c/, and in FIG. 17, the protective film Fp, respectively by activation of the two independent areas 70, 71 of the vacuum grippers, then the robotic arm is moved until positioning the vacuum gripper 7 right above the rubbish bin. The deactivation of the two areas of the vacuum gripper ensures the release of the lid and of the protective sheet Fp into the rubbish bin.

In FIG. 19, the first jaw 30 and the second jaw 31 of the motor-driven clamp are positioned so that the distal ends of the jaws bear respectively against the protruding portions of the first face F1 and the second face F2 of the container Ca, then the jaws are spread apart so as to make the container yawn thereby generating, on the one hand, the first interspace It1 between the first face F1 and the first case It1 and, on the other hand, the second interspace It2 between the second face F2 and the last case ltd.

In FIG. 20, the first jaw 30 and the second jaw 31 of the motor-driven clamp are inserted upon the descent respectively in the first and second interspaces It1 and It2 and according to /d/, the first jaw 30 then inserted between the first face F1 and the first case It1, and the second jaw then inserted between the second face F2 and the last case ltd of the row. During the descent of the jaws 30, 31 in the container, the first jaw 30 and the second jaw 31 could be brought close to each other and until seizing up the row of cases, at the low end-of-stroke, as illustrated in FIG. 20.

Figure 21:
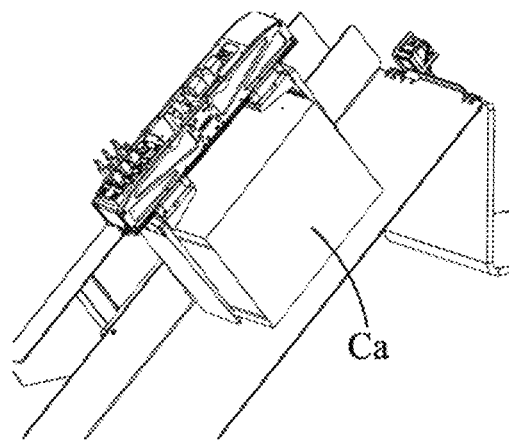
FIG. 21 is a view consecutive to FIG. 20, for which the robotic arm extracts the cases from the container wedged on the positioning table, and sets them on an inclined ramp of the conveyor of the packaging line.

In FIG. 21, the robotic arm extracts the row of cases from the container grasped by the jaws 53, 54 and sets the row of cases on the packaging line Lg by spreading the first and second jaws 30, 31 apart. Setting may be performed on an inclined ramp as shown in FIG. 21.

Figure 22:
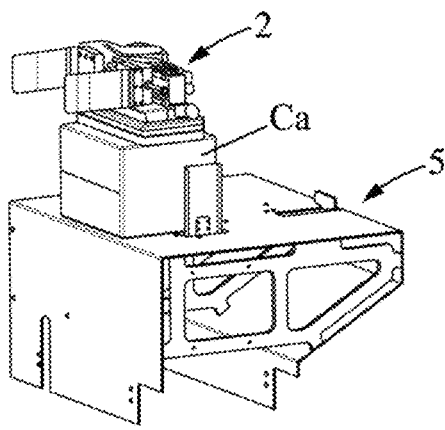
FIG. 22 is a view consecutive to FIG. 21, for which the robotic arm grasps the empty container by the vacuum gripper, the latter having been recently turned over by 90° by the tilter, in the opposite direction of the scale with respect to setting of the container (cf.

In FIG. 22, the robotic arm 1 is brought to grasp the empty container, tilted beforehand by 90° by the tilter, in the reverse direction in comparison with FIG. 12, thanks to the vacuum gripper 7, after spreading the jaws 53, 54 of the tilter apart then evacuates the empty container and releases the empty container in the rubbish bin, and as shown in FIG. 23. The cycle ends.

LIST OF THE REFERENCE SIGNS

1. Robotic arm,
2. Gripping system,
3. Motor-driven clamp,
30, 31. First jaw and second jaw,
4. Cutting tool such as a blade,
5. Positioning table,
50. Wedging stops,
51. Tilter,
52. Actuator of the clamp of the tilter,
53,54. Movable jaw and fixed jaw of the tilter,
6. Camera,
60. Fields of the camera,
7. Suction cup system,
70, 71. Two independent grasping areas (suction cup),
8. Detection system,
Ca. Parallelepiped container,
Mv. Visual marking indicative of the orientation of the container,
F1, F2, F3, F4, F5, F6. Respectively first, second, third, fourth, fifth and sixth face of the container,
It1 It2. First interspace and second interspace, db. Protruding portion of the faces (F1 and F2) of the container
Lg. Packaging line,
Et. Cases,
Et1, Etd. First case and last case of the row
L1, L2, L3, L3. Fold lines,
Eb. Mouth,
Vf. Closure flaps.

The invention claimed is:

1. A robotic method for loading cases (Et) on a packaging line (Lg) from cases contained in a closed parallelepiped container,
and wherein each of said cases (Et) comprising four fold lines (L1, L2, L3, L4) configured to enable the storage of the cases in their laid-flat position (P1), and enable unfolding of the case around the four fold lines (L1, L2, L3, L4) in a volume-formed position (P2) where the case defines a tubular volume with at least one mouth (Eb) enabling filling of the case, the case having closure flaps (Vf) configured to enable closure of said mouth
and wherein the cases (Et) are received in the container (Ca) in their laid-flat position (P1), in parallel against each other in the form of a row of cases, extending between two opposite faces of the parallelepiped container, called first face (F1) and second face (F2), the row of cases laid flat having a first case (En) of the row, laid flat, disposed parallel to the first face (F1) of the container, opposite the first face (F1), and a last case (Etd) of the row laid flat, parallel to the second face (F2), opposite the second face, the cases extending according to the direction of the fold lines between a third face (F3) and a fourth face (F4) of the container, opposite to one another, a fifth face (F5) and a sixth face (F6) defining the bottom and the lid of the container and wherein said method is implemented by an installation comprising a robotic arm (1) handling a gripping system (2) having a motor-driven clamp (3) with two jaws consisting of a first jaw (30) and a second jaw (31), as well as an actuation mechanism configured to spread apart and bring the two jaws close to each other,
in which method it is proceeded with the loading of the packaging line (Lg), after opening of the container (Ca) by:
/d/ insertion of the first jaw (30) of the clamp between the first face (F1) of the container and the first case (Et1) of the row of cases and, insertion of the second jaw (31) of the clamp between the last case (Etd) of the row of cases and the second face (F2) of the container, and approach of the first jaw (30) and of the second jaw (31) then inserted in the container until seizing up the row of cases,
/e/ piloting of the robotic arm so as to extract the row of cases from the container grasped by the motor-driven clamp (3) and load the packaging line (Lg) with the row of cases, after the release of the row of cases by spreading apart the two jaws (30, 31) of the motor-driven clamp,
and wherein the first face (F1) and the second face (F2) of the container respectively having portions (db) protruding in height extending above the row of cases, on the side of the opening of the open container, the method providing, prior to /d/, for:
the positioning of the distal ends respectively of the first jaw (30) and of the second jaw (31) facing the protruding portions (db) of the first face (F1) and of the second face (F2) of the container, and,
the control of the drive mechanism to spread the two jaws (30, 31) of the motor-driven clamp apart and thus spread the first face (F1) apart from the second face (F2) of the container, while generating, on the one hand, a first interspace (It1) between the first face (F1) and the first case (Et1) of the row of cases, and, on the other hand, a second interspace (It2) between the last case (Et2) and the second face (F2) of the row
and so that at /d/ the insertion of the first jaw (30) of the motor-driven clamp between the first face (F1) of the container and the first case (Et1) of the row and, the insertion of the second jaw (31) of the clamp between the last case (Et2) of the row and the second face (F2) of the container are performed through the descent of the first jaw and of the second jaw respectively in the first interspace (It1) and the second interspace (It2).

2. The case loading robotic method according to claim 1, providing, prior to /d/ and /e/, for the opening of the container when the container rests on a surface through the fifth face (F5) of the container by:
/c/ piloting the robotic arm so as to open or remove the sixth face (F6) of the container forming the lid.

3. The case loading robotic method according to claim 2, wherein the gripping system (2) handled by the robotic arm (1) comprises a cutting member (4), and wherein at /c/ the robotic arm handling the cutting member is piloted so that the cutting member (6) performs a continuous peripheral cut along the first, second, third and fourth faces of the container, and so as to enable the removal of the sixth face (F6) forming a lid.

4. The case loading robotic method according to claim 3, wherein, consecutively to /c/ the robotic arm (1) is piloted so as to grasp the lid detached by the peripheral cut, then to evacuate said lid.

5. The case loading robotic method according to claim 4, wherein said installation comprises a positioning table (5), comprising a setting plane extending according to the directions X and Y, said positioning table (5) comprising stops (50) cooperating with at least two perpendicular faces of the container ensuring wedging of the container and wherein the insertions of the jaws of the clamp according to /d/, and/or opening of the container according to /c/ are performed after wedging of the container by the stops (50) according to the directions X and Y.

6. The case loading robotic method according to claim 5, wherein said installation comprises at least one area (Z1; Z2) for storing the containers stacked on top of each other on a pallet, and wherein it is proceeded with loading of the positioning table by:
/b/ grasping of a container stacked on the pallet by the robotic arm then piloting of the robotic arm to proceed with setting of the container (Ca) on the positioning table (5).

7. The case loading robotic method according to claim 6, wherein said containers comprising a visual marking (Mv) indicative of the orientation of the container according to the horizontal plane XY, and wherein the gripping system (2) is equipped with a camera (6), and wherein, prior to /b/, it is proceeded with the recognition of the container by:
/a/ piloting of the robotic arm handling the gripping system so as to target the visual marking (Mv) of a container stocked at the top of the stack in the field of view (60) of the camera (6),
and wherein said installation having:
a recognition module configured to recognise the visual marking (Mv) of the image targeted by the camera (6)

and to determine the angle of the marking of the container in the reference frame of the positioning table (5), and a computing module configured to generate, from the angle of the marking determined by the recognition module, guide instructions that instruct, at /b/, grasping of the targeted container in the field of the camera and setting of the container on the positioning table according to a determined orientation of the visual marking in the reference frame of the positioning table.

8. The case loading robotic method according to claim 6, wherein it is proceeded with a turnover of the container by 180° between grasping of the container in /b/, firstly, for which grasping of a container stacked on the pallet is ensured by the robotic arm and then piloting of the robot to proceed with setting of the container on the positioning table and, secondly, wedging of the container according to the directions X and Y on the stops of the positioning table (5).

9. The case loading robotic method according to claim 8, wherein the turnover of the container by 180° is conducted, in /b/, by the robotic arm during setting of the container, and by a tilter (51) controlled by an actuator of the positioning table (5).

10. The case loading robotic method according to claim 9, wherein the gripping system (2) comprises a vacuum gripper (7) configured to ensure grasping of the container during /b/, and/or configured for grasping of the lid and the evacuation thereof.

11. The case loading robotic method according to claim 10, wherein the vacuum gripper is a dual-zone gripper, with two independent grasping areas (70, 71) and wherein the container receiving the row of cases, as well as a protective sheet (Fp) disposed inside the container, interposed between the lid and the cases, and wherein grasping of the lid detached by the peripheral cut is ensured by one of the two areas (70, 71) of the vacuum gripper, and the protective sheet (Fp) is grasped by the other one of the two areas (70, 71) of the vacuum gripper, before evacuating the lid and the protective sheet together by the robotic arm grasped by the two areas of the vacuum gripper.

12. The case loading robotic method according to claim 1, wherein said installation comprises two areas (Z1, Z2) for storing the containers consisting of a first storage area (Z1) and a second storage area (Z2) each receiving containers (Ca) stacked on a pallet (PL1 or PL2), each of the storage areas, accessible by the robotic arm (1) for the implementation of /b/, and wherein the two storage areas (Z1, Z2) are separated by a physical barrier or a virtual monitoring barrier, the two storage areas respectively having two independent entrances (E1, E2) for an operator (Op), and wherein said installation comprises means for detecting an intrusion of the operator, configured to detect, while distinguishing them, an intrusion in the first storage area (Z1) and in the second storage area (Z2) and wherein the module for piloting and controlling the robotic arm is configured to work in masked time in one of the two storage areas (Z1, Z2) when an intrusion is detected in the other storage area.

\* \* \* \* \*